(12) United States Patent
Claffee et al.

(10) Patent No.: US 10,578,197 B2
(45) Date of Patent: Mar. 3, 2020

(54) ROBOTIC ARM AND WRIST MECHANISMS

(71) Applicant: iRobot Corporation, Bedford, MA (US)

(72) Inventors: Mark R. Claffee, Methuen, MA (US); Timothy R. Ohm, Grover Beach, CA (US); Erik Amaral, Lexington, MA (US); Annan M. Mozeika, Andover, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/813,933

(22) Filed: Nov. 15, 2017

(65) Prior Publication Data

US 2018/0073614 A1 Mar. 15, 2018

Related U.S. Application Data

(63) Continuation of application No. 14/610,013, filed on Jan. 30, 2015, now Pat. No. 9,845,850.

(51) Int. Cl.
*B25J 18/00* (2006.01)
*F16H 25/20* (2006.01)
*B25J 17/02* (2006.01)

(52) U.S. Cl.
CPC .......... *F16H 25/20* (2013.01); *B25J 17/0266* (2013.01); *F16H 2025/2062* (2013.01)

(58) Field of Classification Search
CPC ........ B25J 17/0266; B25J 9/102; B25J 9/123; F16H 2025/2062; F16H 25/20; F16H 35/18

See application file for complete search history.

(56) References Cited

U.S. PATENT DOCUMENTS 2,482,082 A 9/1949 Wahlberg
2,940,322 A 6/1960 Uhing
(Continued)

FOREIGN PATENT DOCUMENTS

DE 1927767 12/1970
DE 4002151 8/1991
(Continued)

OTHER PUBLICATIONS

Design and Control of a Robotic Wrist with Two Collocated Axes of Compliant Actuation; 2014 IEEE International Conference on Robotics & Automation (ICRA) Hong Kong Convention and Exhibition Center May 31-Jun. 7, 2014. Hong Kong, China (Year: 2014).*

(Continued)

*Primary Examiner* — Muhammad S Islam
(74) *Attorney, Agent, or Firm* — Schwegman Lundberg & Woessner, P.A.

(57) ABSTRACT

A robot includes a support, a movable member coupled to the support to permit gimbal rotation about a pitch axis and a yaw axis, and first and second linear actuators connected to each of the support and the movable member and operable to rotate the movable member about the pitch axis and the yaw axis. The first linear actuator is pivotally attached to the movable member at a first pivot point. The second linear actuator is pivotally attached to the movable member at a second pivot point. The first and second pivot points are each angularly offset from the pitch axis and the yaw axis by about 45 degrees and are located on the same side of the pitch axis.

19 Claims, 19 Drawing Sheets

(56) References Cited

U.S. PATENT DOCUMENTS

| | | | |
|---|---|---|---|
| 4,253,342 | A | 3/1981 | Uhing |
| 4,573,367 | A | 3/1986 | Uhing |
| 4,614,124 | A | 9/1986 | Uhing |
| 5,299,465 | A | 4/1994 | Kasuga |
| 5,740,699 | A | 4/1998 | Ballantyne et al. |
| 6,557,432 | B2 | 5/2003 | Rosheim |
| 2003/0101838 | A1* | 6/2003 | Shinozaki ............... A61F 2/585 74/490.05 |
| 2004/0146388 | A1 | 7/2004 | Khajepour et al. |
| 2008/0075561 | A1* | 3/2008 | Takemura ............... F16F 1/025 414/2 |
| 2009/0211390 | A1 | 8/2009 | Brogardh et al. |
| 2011/0067517 | A1 | 3/2011 | Ihrke et al. |
| 2011/0071671 | A1* | 3/2011 | Ihrke ................... B25J 17/0258 700/245 |
| 2014/0126951 | A1 | 5/2014 | Bannasch et al. |
| 2014/0132020 | A1 | 5/2014 | Claffee et al. |
| 2014/0238177 | A1 | 8/2014 | Nagatsuka |
| 2014/0311271 | A1 | 10/2014 | Cao et al. |

FOREIGN PATENT DOCUMENTS

| | | |
|---|---|---|
| EP | 1857230 | 11/2007 |
| WO | 97/09153 | 3/1997 |

OTHER PUBLICATIONS

Partial Supplementary European Search Report Corresponding to European Application No. 16743948.8 (14 pages) (dated Oct. 9, 2018).

Notification of Transmittal of the International Search Report and the Written Opinion of the International Searching Authority, or the Declaration, in corresponding PCT Application No. PCT/US2016/014879 (14 pages) (dated May 31, 2016).

"Roller screw" Wikipedia, the free encyclopedia, Retrieved from: http://en.wikipedia.org/wiki/Roller_screw (6 pages) (Retrieved on: Jan. 16, 2015).

"Ball screw" Wikipedia, the free encyclopedia, Retrieved from: http://en.wikipedia.org/wiki/Ball_screw (4 pages) (Retrieved on: Jan. 16, 2015).

"Rolling-element bearing" Wikipedia, the free encyclopedia, Retrieved from: http://en.wikipedia.org/wiki/Rolling-element_bearing (8 pages) (Retrieved on: Jan. 16, 2015).

"Linear actuator" Wikipedia, the free encyclopedia, Retrieved from: http://en.wikipedia.org/wiki/Linear_actuator (8 pages) (Retrieved on: Jan. 16, 2015).

Mraz, Stephen "A Critical Look at Acme, Ball, and Roller Screws for Linear Motion" Retrieved on: Nov. 6, 2014 from: http://machinedesign.com/print/motion-control/critical-look-acme-ball-and-roller-screws-linear-motion (6 pages) (May 6, 2009).

Everman, Mike "Differential Roller Screw" Retrieved on Dec. 16, 2014 from the Internet at URL: https://www.youtube.com/watch?v=iPkoGug-oC0 (2 Pages) (Jun. 17, 2008).

"Uhing®-Linear drive nut (linear actuator)" Joachim Uhing GmbH & Co. KG, Retrieved from: https://www.uhing.com/en/linear-drive-nut (3 pages) (Retrieved on: Jan. 16, 2015).

"The Uhing® rolling ring drive principle" Joachim Uhing GmbH & Co. KG, Retrieved from: https://www.uhing.com/en/rolling-ring-drive (3 pages) (Retrieved on: Jan. 16, 2015).

"Uhing Products: Linear technology, Winding Systems, Rolling Ring Drive, Guide System" Joachim Uhing GmbH & Co. KG, Retrieved from: https://www.uhing.com/en (4 pages) (Retrieved on: Jan. 16, 2015).

"The Secret of the Uhing Drive Nut" Press Release, Joachim Uhing GmbH & Co. KG, Retrieved from: http://www.uhing.com/docs/PI0902_02_RS.pdf (2 pages) (Mar. 16, 2009).

"Amacoil's Uhing Model RS4 Drive Nut" Product Design & Development, Retrieved on: Nov. 5, 2014 from: http://www.pddnet.com/product-releases/2012/01/amacoils-uhing-model-rs4-driver-nut (1 page) (Jan. 24, 2012).

Operating Instructions for the RS Drive Nut, Joachim Uhing GmbH & Co. KG, vol. 1 (34 pages) (May 2, 2014).

Linear Drive Nut, Uhing Linear Drives®, Joachim Uhing GmbH & Co. KG (8 pages) (Mar. 2014).

Supplementary European Search Report corresponding to European Application No. 16743948.8 (dated Jan. 28, 2019).

* cited by examiner

ROBOTIC ARM AND WRIST MECHANISMS

RELATED APPLICATION

The present application is a continuation of and claims priority from U.S. patent application Ser. No. 14/610,013, filed Jan. 30, 2015, the disclosure of which is incorporated herein by reference in its entirety.

STATEMENT OF GOVERNMENT SUPPORT

This invention was made with support under Defense Advanced Research Projects Agency (DARPA) Contract No. W31P4Q-13-0077 awarded by DARPA for the DARPA Low Cost Arm. The Government has certain rights in the invention.

FIELD

The present invention relates to robots and, more particularly, to robotic arms and wrist mechanisms.

BACKGROUND OF THE INVENTION

Robotic arms are commonly used to manipulate and/or grasp objects in a selected environment. The environment may be structured or unstructured. Such robotic arms may be provided with end effectors or graspers.

SUMMARY OF THE INVENTION

According to embodiments of the invention, a robot includes a support, a movable member coupled to the support to permit gimbal rotation about a pitch axis and a yaw axis, and first and second linear actuators connected to each of the support and the movable member and operable to rotate the movable member about the pitch axis and the yaw axis. The first linear actuator is pivotally attached to the movable member at a first pivot point. The second linear actuator is pivotally attached to the movable member at a second pivot point. The first and second pivot points are each angularly offset from the pitch axis and the yaw axis by about 45 degrees and are located on the same side of the pitch axis.

In some embodiments, the robot includes a gimbal joint between the movable member and the support, and the pitch axis and the yaw axis intersect at a central axis of the gimbal joint.

In some embodiments, the first and second linear actuators are each attached to the movable member by ball joints or universal joints. The first and second linear actuators may each be attached to the support by ball joints or universal joints.

According to some embodiments, the robot includes an end effector mounted on the movable member for movement therewith.

In some embodiments, the first and second linear actuators each include a lead screw having a lead screw longitudinal axis and including a lead screw thread and a drive nut assembly. The drive nut assembly includes a guide holder and first, second and third guide bearing assemblies. The first, second and third guide bearing assemblies each include a rotation bearing mounted on the guide holder, and a plurality of annular guide ribs on the rotation bearing. The rotation bearing permits rotation of the guide ribs about a guide axis relative to the guide holder and the lead screw. The guide axis forms an oblique cant angle with the lead screw longitudinal axis. The first, second and third guide bearing assemblies are serially disposed along the lead screw longitudinal axis and the oblique cant angle of the second guide bearing assembly is opposite the oblique cant angles of the first and third guide bearing assemblies. The guide ribs are mated with the lead screw thread such that rotation of the lead screw is converted to thrust on the guide holder.

According to embodiments of the invention, a robot includes a support, a movable member coupled to the support by a universal joint, and a power and/or data transmission cable. The universal joint includes a first yoke attached to the movable member and including a first opening extending therethrough, a second yoke connected to the support and including a second opening extending therethrough, and a hinge link member pivotally coupled to the first yoke for relative rotation about a first hinge axis and pivotally coupled to the second yoke for relative rotation about a second hinge axis perpendicular to the first hinge axis. The hinge link member includes a third opening extending therethrough. The power and/or data transmission cable extends from the movable member through the first, second and third openings to the support.

In some embodiments, the first and second yokes each include a clevis pivotally attached to the hinge link member. In some embodiments, the second yoke includes a tubular, elongate connection portion integral with the second yoke and extending from the second yoke to the support, and the cable extends through the connection portion. In some embodiments, the cable terminates at an electrical component mounted on the movable member and at an electrical component mounted on the support.

According to embodiments of the invention, a linear actuator includes a lead screw and a drive nut assembly. The lead screw has a lead screw longitudinal axis and including a lead screw thread. The drive nut assembly includes a guide holder and first, second and third guide bearing assemblies. The first, second and third guide bearing assemblies each include a rotation bearing mounted on the guide holder, and a plurality of annular guide ribs on the rotation bearing. The rotation bearing permits rotation of the guide ribs about a guide axis relative to the guide holder and the lead screw. The guide axis forms an oblique cant angle with the lead screw longitudinal axis. The first, second and third guide bearing assemblies are serially disposed along the lead screw longitudinal axis and the oblique cant angle of the second guide bearing assembly is opposite the oblique cant angles of the first and third guide bearing assemblies. The guide ribs are mated with the lead screw thread such that rotation of the lead screw is converted to thrust on the guide holder.

In some embodiments, the guide ribs are circular.

According to some embodiments, the rotation bearings of the first, second and third guide bearing assemblies are each rolling element bearings.

In some embodiments, the linear actuator includes an actuator operable to forcibly rotate the lead screw about the lead screw longitudinal axis relative to the guide holder.

According to embodiments of the invention, a robot arm includes a plurality of arm links each including an integral joint feature. The arm links are serially connected to one another by their respective joint features at corresponding joints. The arm links each include a hollow shell. The robot arm further includes actuators housed in the hollow shells of the arm links. The arm links collectively serve as a repositionable load bearing frame of the arm for supporting a load on a distal end of the arm. The robot arm does not include an internal support frame linking the arm links.

According to some embodiments, the plurality of arm links includes at least five arm links. In some embodiments, the robot arm includes, in series, a roll joint, a pitch joint, a roll joint, a pitch joint, and a roll joint.

According to some embodiments, each of the plurality of arm links is formed of a molded polymeric material. In some embodiments, each of the joint features is integrally molded with its corresponding arm link.

In some embodiments, each of the hollow shells includes a pair of mated clam shells.

In some embodiments, at least one of the arm links includes a pair of laterally opposed hinge features that mount on opposed sides of the hinge feature of the adjacent arm link to form the joint therebetween.

The robot arm may include: an actuator assembly including a motor and a gearbox, wherein the gearbox includes a central hole extending therethrough and substantially concentric with an axis of rotation of one of the joints; and a power and/or data transmission cable that extends through the central hole.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
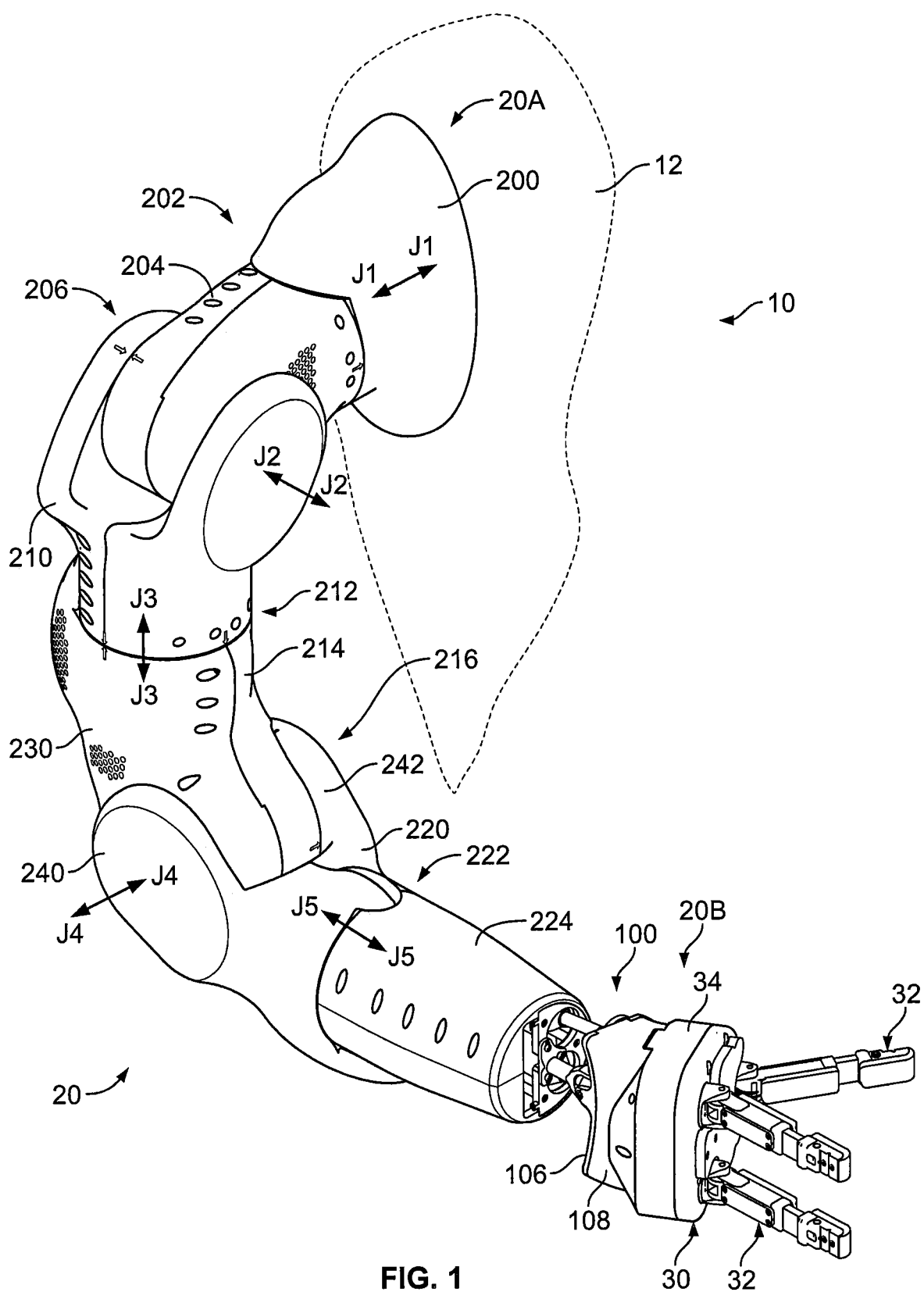
FIG. 1 is a perspective view of a robotic arm including an end effector and a wrist mechanism according to embodiments of the invention.
Figure 2:
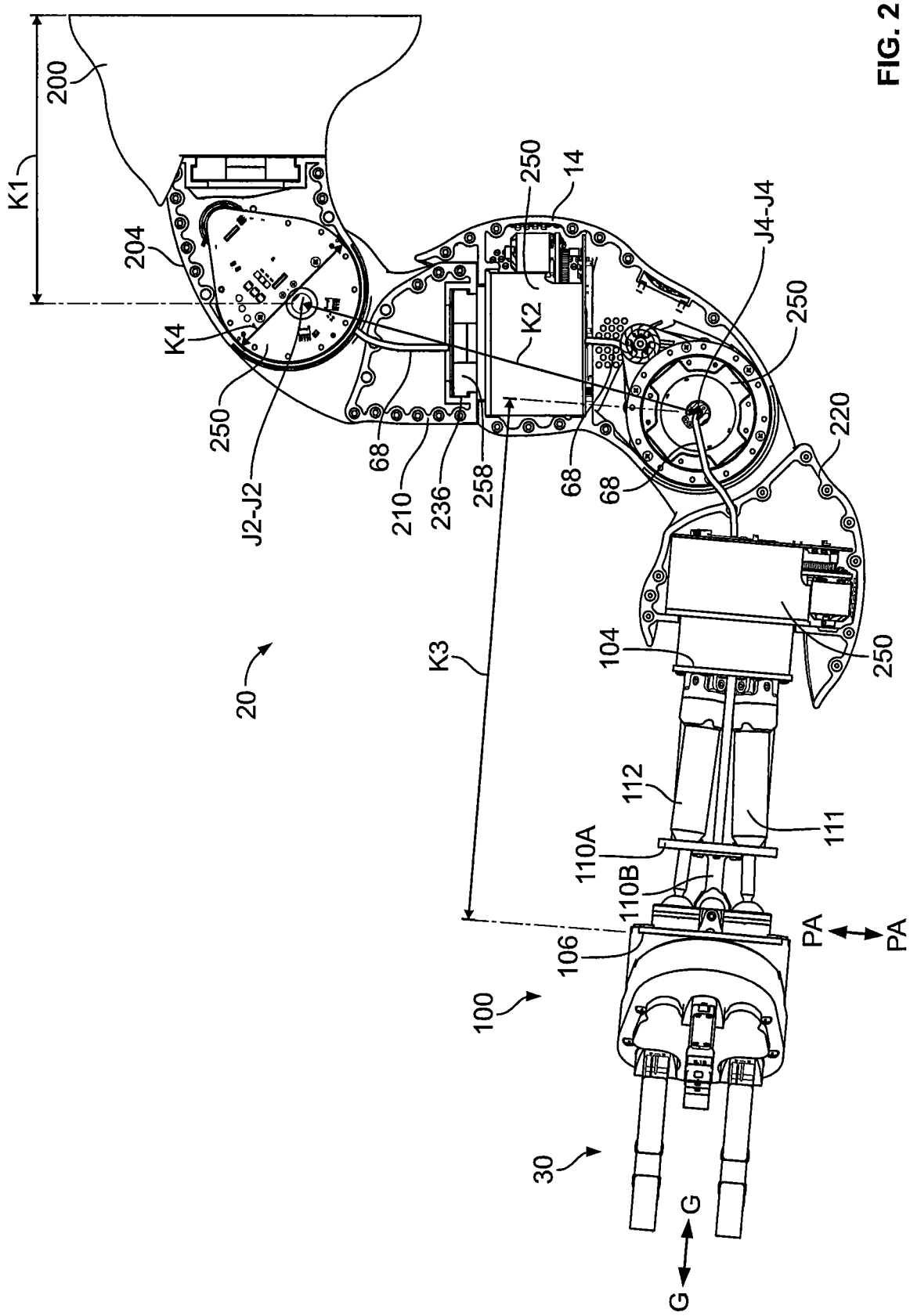
FIG. 2 is a side view of the robotic arm of FIG. 1 with clamshell members removed from the facing side thereof.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "monolithic" means an object that is a single, unitary piece formed or composed of a material without joints or seams.

Embodiments of the present invention are directed to robotic arms. An arm as disclosed herein may form part of a robot or a prosthetic apparatus. In particular, the robotic arm may support an end effector and be used to manipulate and grasp objects in a structured or unstructured environment. The arm may be employed as an arm of a humanoid robot. Aspects of the inventive arm may enable low cost manufacture of the arm.

With reference to FIGS. 1-20, a robot 10 (FIG. 1) including a robotic arm 20 according to embodiments of the invention is shown therein. The robotic arm 20 may be operationally mounted at its proximal end 20A on a robot torso 12 or other suitable support or base, for example. The arm 20 includes an end effector 30 coupled to its distal end 20B by a wrist mechanism 100 according to embodiments of the invention.

The end effector 30 (FIGS. 1-3) may be of any suitable configuration, construction and functionality. In some embodiments, the end effector 30 is constructed as disclosed in U.S. Published Patent Application No. 2014/0132020 A1, published May 15, 2014, the disclosure of which is incorporated herein by reference in its entirety. The illustrative end effector 30 includes a base 34 and fingers 32. The fingers 32 are pivotally coupled to the base 34 by hinges 32A. Each finger 32 also includes a pair of phalanges 32B pivotally connected by a flexible joint 32C. The base 34 contains electronics and mechanisms operative to move the fingers 32 relative to one another and to the base 34 to effect desired operations such as grasping, releasing, etc.

The wrist mechanism 100 includes a support in the form of a motor plate 104 and a movable member in the form of a wrist plate 106. An angled, rigid submount 108 is affixed to the wrist plate 106 and the end effector base 34 is in turn affixed to the submount 108 so that the base 34 is oriented at an oblique angle with respect to the wrist plate 106. The wrist mechanism 100 further includes a substantially rigid, fixed length link 110 (hereinafter, referred to as the bone link), a first linear actuator 111, and a second linear actuator 112 each connecting the motor plate 104 and wrist plate 106 in spaced apart relation.

The bone link 110 includes a midplate 110A, a tubular, elongate connecting portion 110B, and three elongate struts 110C. A passage or bore 115 extends axially through the connecting portion 110B and terminates at opposed end openings 115A, 115B. The struts 110C are rigidly affixed to and extend rearwardly from the midplate 110A to the motor plate 104. The struts 110C are rigidly affixed to the motor plate 104 at their proximal ends. The connecting portion 110B is rigidly affixed to and extends forwardly from the midplate 110A toward the wrist plate 106. The connecting portion 110B is connected to the wrist plate 106 at its distal end by a distal joint 120.

Each linear actuator 111, 112 extends through the midplate 110A and is connected to the motor plate 104 at its proximal end by a proximal joint 114 and is connected to the wrist plate 106 at its distal end by a distal joint 116.

The joints 114, 120 are universal joints (described in more detail below). The universal joint 120 serves as a wrist joint about which the wrist plate 106 can be pivoted, as discussed below. In other embodiments, the proximal end of the bone link 110 may instead be connected to the motor plate 104 by a universal joint.

The joints 116 are ball-in-socket joints. The joints 116 (FIG. 7) each include a ball 116A affixed to the distal end of the linear actuator 111, 112 and rotatably captured in a semi-spherical socket 116B affixed to the wrist plate 106. In other embodiments, the joints 116 may be universal joints.

The bone distal universal joint 120 (FIG. 9) includes an inner yoke portion in form of a U-joint, fork or clevis 122 integral with the bone link connecting portion 110B, an outer yoke portion in the form of a U-joint, fork or clevis 124 integral with wrist plate 106, and a hinge link member 126 pivotally coupled to the yokes 122, 124 by pivot pins (e.g., bolts) 127, 129. A bore or opening 126A is defined in the hinge link member 126. An opening 106A is defined in the wrist plate 106 in alignment with the opening 126A and the space between the arms of the outer clevis 124. The bore 115 also aligns with the opening 126A and the space between the arms of the inner clevis 122.

Figure 3:
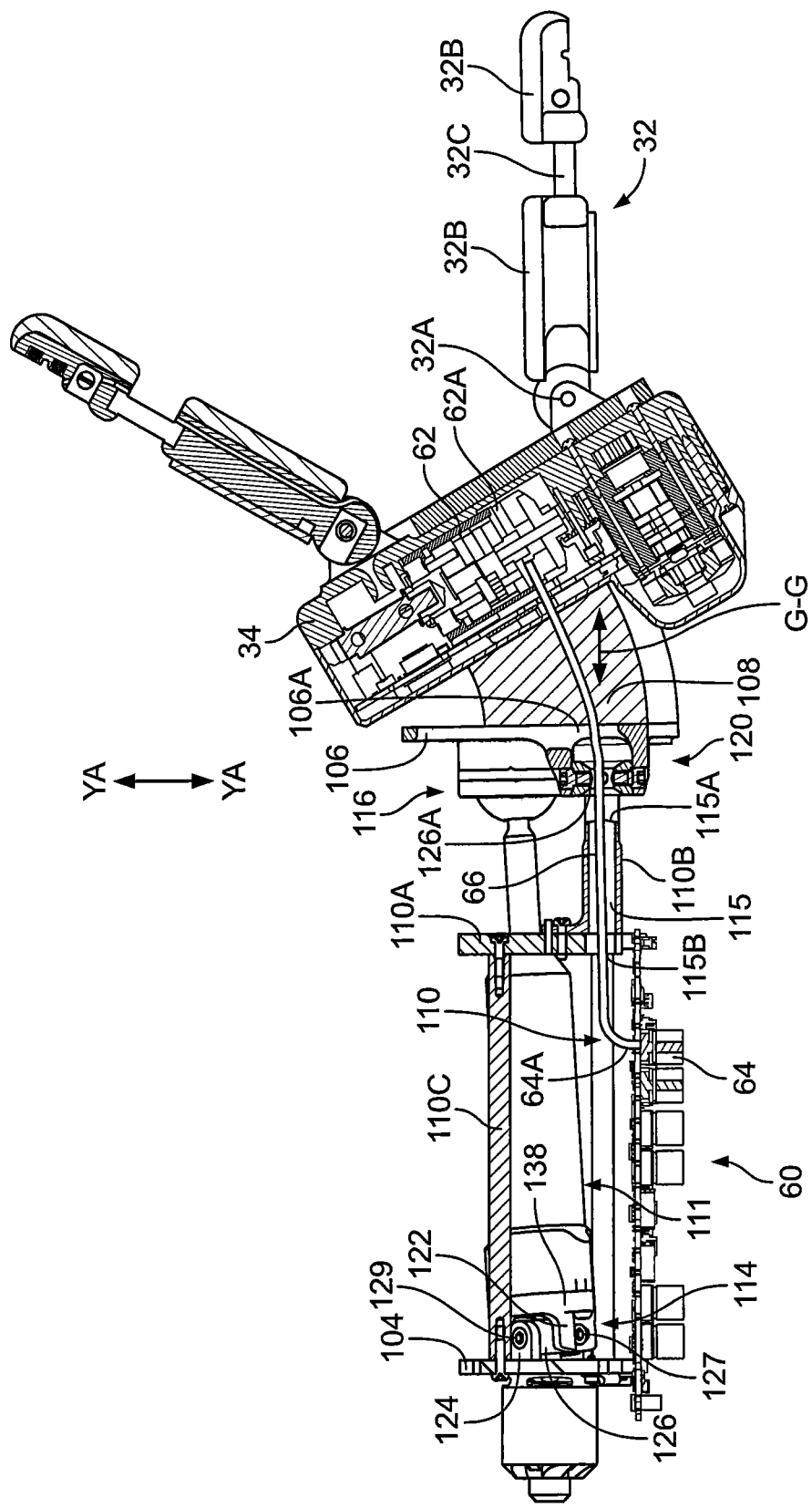
FIG. 3 is a cross-sectional view of the wrist mechanism and end effector of FIG. 1.

With reference to FIG. 3, the linear actuator proximal joints 114, 116 each also include an inner clevis 122 integral with a back plate 138 (which forms a part of the linear actuator 111, 112), an outer clevis 124 integral with motor plate 104, and a hinge link member 126 pivotally coupled to the devises 122, 124 by pivot pins 127, 129. An opening 104A (FIG. 4) is defined in the motor plate 104 in alignment with the space between the arms of the clevis 124, the hinge link member opening 126A and a back plate opening 138A.

The linear actuators 111, 112 may be substantially identical in construction and therefore only the linear actuator 111 will be described in detail below, it being understood that this description likewise applies to the other linear actuator 112.

The linear actuator 111 includes a motor 132 and a transmission assembly 134. In some embodiments, the motor 132 is a backdrivable electric motor. In some embodiments, the motor 132 is a brushless DC outrunner motor. The motor 132 (FIG. 4) includes a housing 132A and an output shaft 132B. The output shaft 132A includes axially and radially extending male splines 132C.

Figure 4:
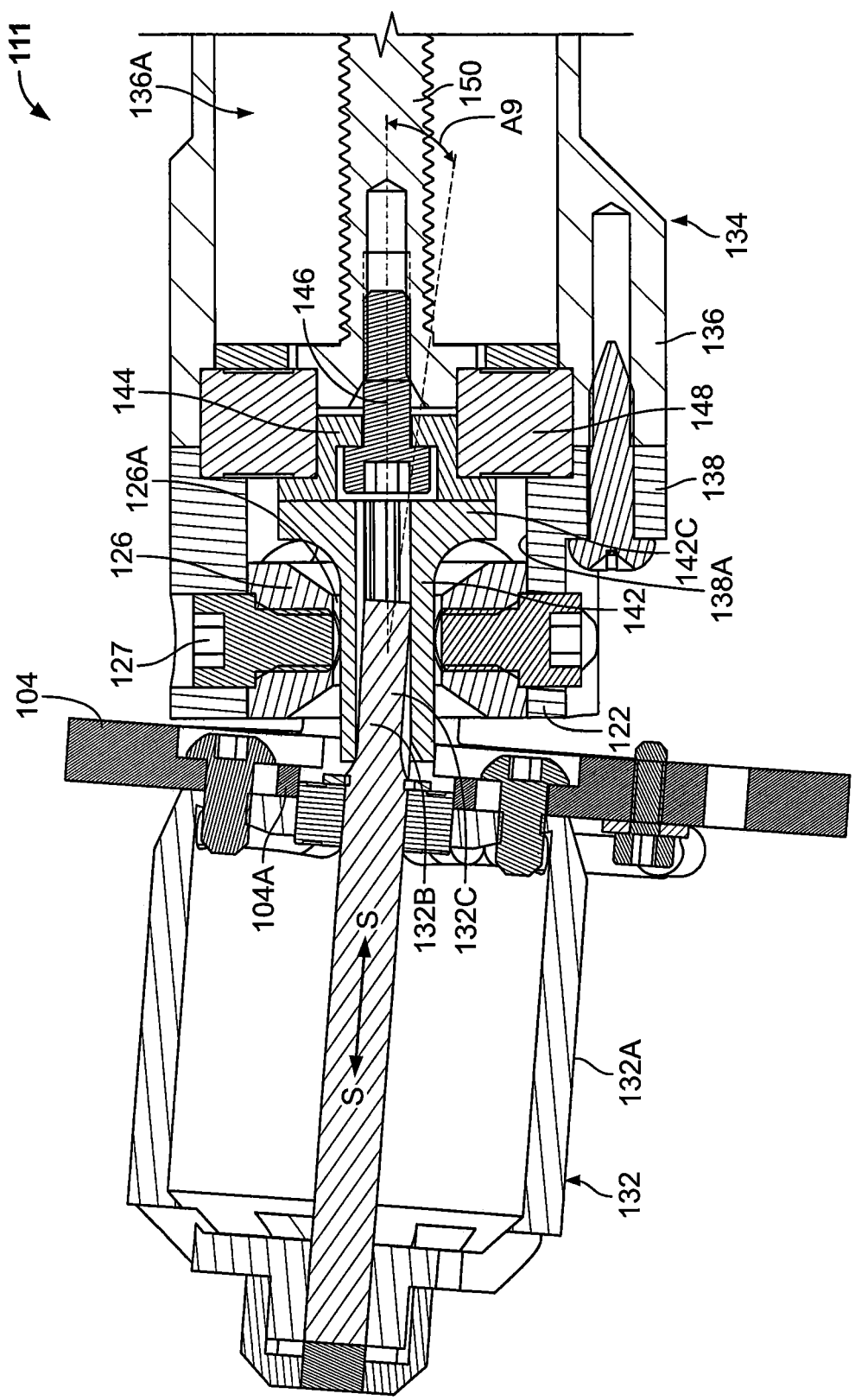
FIG. 4 is an enlarged, fragmentary, cross-sectional view of the wrist mechanism of FIG. 1.
Figure 5:
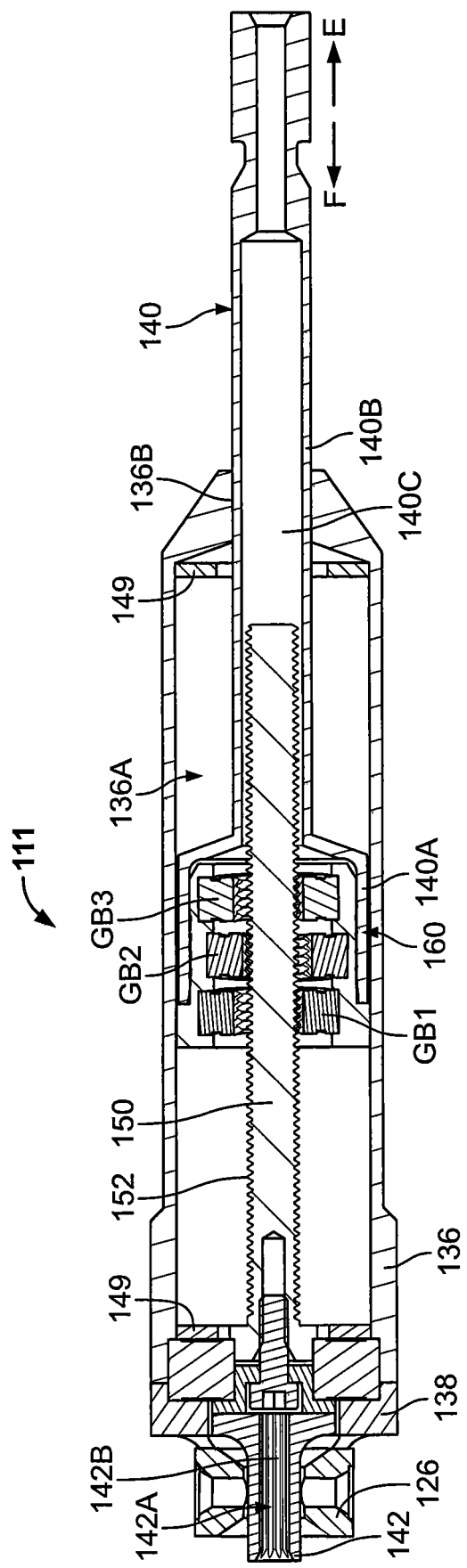
FIG. 5 is an enlarged, fragmentary, cross-sectional view of a linear actuator forming a part of the wrist mechanism of FIG. 1.

With references to FIGS. 4 and 5, the transmission assembly 134 includes an outer housing 136, the back plate 138, an output member, shaft or rod 140, a spline gear 142, a spline cap 144, a spline bolt 146, an end bearing 148, bumper washers 149, a lead screw 150 and a drive nut assembly 160. The inner clevis 122 forms a part of the back plate 138. The lead screw 150 has a helical outer thread 152.

The motor 132 is affixed to the proximal side of the motor plate 104 by bolts such that the output shaft 132B extends through the openings 104A, 126A. The spline gear 142 is captured between the spline cap 144 and the hinge link member 126 and extends through the openings 104A, 126A, 138A to receive the output shaft 132B in a spline bore 142A of the spline gear 142. The motor splines 132C operatively mate with female splines 142B in the bore 142A. The spline gear 142 is formed of a semi-rigid material such as polyurethane.

The spline gear 142 and the universal joint 114 provide a flexible coupling between the motor drive shaft 132B (which remains axially and laterally stationary relative to the motor plate 104) and the lead screw 150 and the rod 140 (which can pivot about the universal joint 114 relative to the motor plate 104). The spline bore 142A is larger in diameter than the output shaft 132B so that the spline gear 142 can tilt or pivot off axis relative to the longitudinal axis of the output shaft 132B, thereby permitting the spline gear to move or pivot within a cone with respect to the output shaft 132B and the motor plate 104. The proximal ends of the linear actuators 111, 112 are thereby permitted to tilt within a prescribed range relative to the motor 132 without compromising the drive connection. According to some embodiments, the spline engagement permits angular displacement of the spline member 142 through a cone centered around the axis of rotation S-S (FIG. 4) of the output shaft 132B having a cone apex angle A9 of at least 5 degrees and, in some embodiments, having a cone apex angle A9 in the range of from about 0 to 10 degrees.

The distal end of the spline gear 142 includes a keyed head 142C that is received in a key slot in the proximal end of the spline cap 144. The spline cap 144 is in turn affixed to the proximal end of the lead screw 150 by the spline bolt 146 such that rotation between the spline cap 144 and the lead screw 150 is prevented. This provides a compliant torque transmission interface between the flexible spline member 142 and the primary drive mechanism, the lead screw 150, without requiring precision alignment between the rigid drive members 132C and 150 The spline cap 144 and the lead screw 150 are located in the housing 136 by the bearing 148, which is captured between the back plate 138 and the housing 136. Thus, rotation of the output shaft 132B is transmitted to the lead screw 150 through the spline member 142, the spline cap 144 and the spline bolt 146. The lead screw 150 extends concentrically through a main bore 136A of the housing 136.

The output rod 140 includes a drive portion 140A slidably disposed and guided in the main bore 136A and an extension portion 140B slidably disposed and guided in a housing end bore 136B. The lead screw 150 is received in a bore 140C of the rod 140. The drive nut assembly 160 is mounted in the drive portion 140A for axial movement with the rod 140. The drive nut assembly 160 operatively engages the lead screw 150 such that the drive nut assembly 160 converts rotation of the lead screw 150 in a first direction into translation of the rod 140 in an extension direction E relative to the housing 138, and converts rotation of the lead screw 150 in the opposite direction into translation of the rod 140 in a retraction direction F relative to the housing 136. In some embodiments, the linear actuators 111, 112 are configured to translate their rods 140 through a range of at least 33 mm and, in some embodiments, such as for an arm of dimensions recited in implementations below with reference to FIG. 2, the linear actuators 111, 112 are configured to translate their rods 140 through a range of at least 60 mm (e.g., +/−30 mm from their neutral positions (FIG. 6)).

Figure 7:
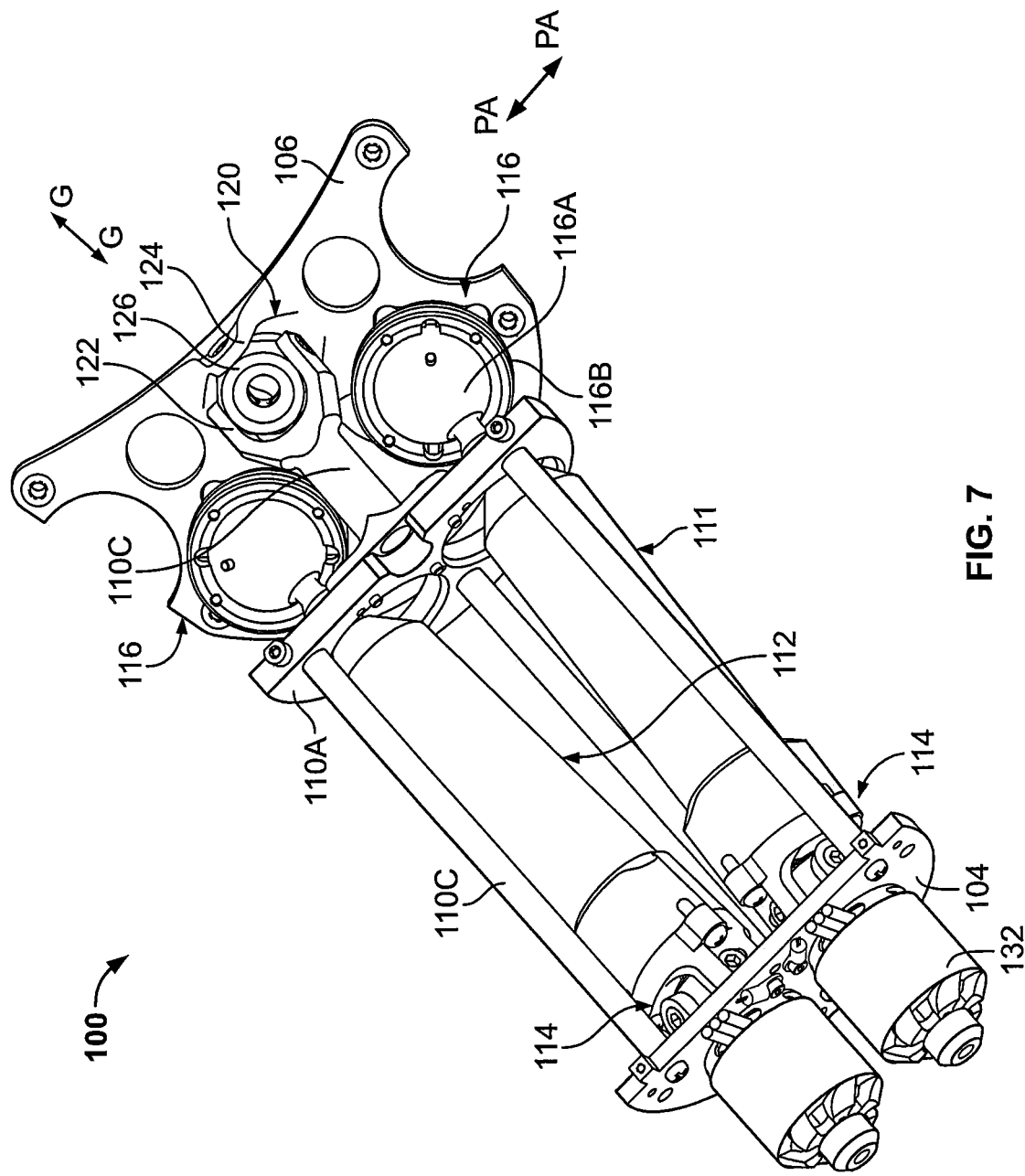
FIG. 7 is a fragmentary, rear perspective view of the wrist mechanism of FIG. 1 wherein a wrist plate thereof is rotated about a pitch axis.
Figure 10:
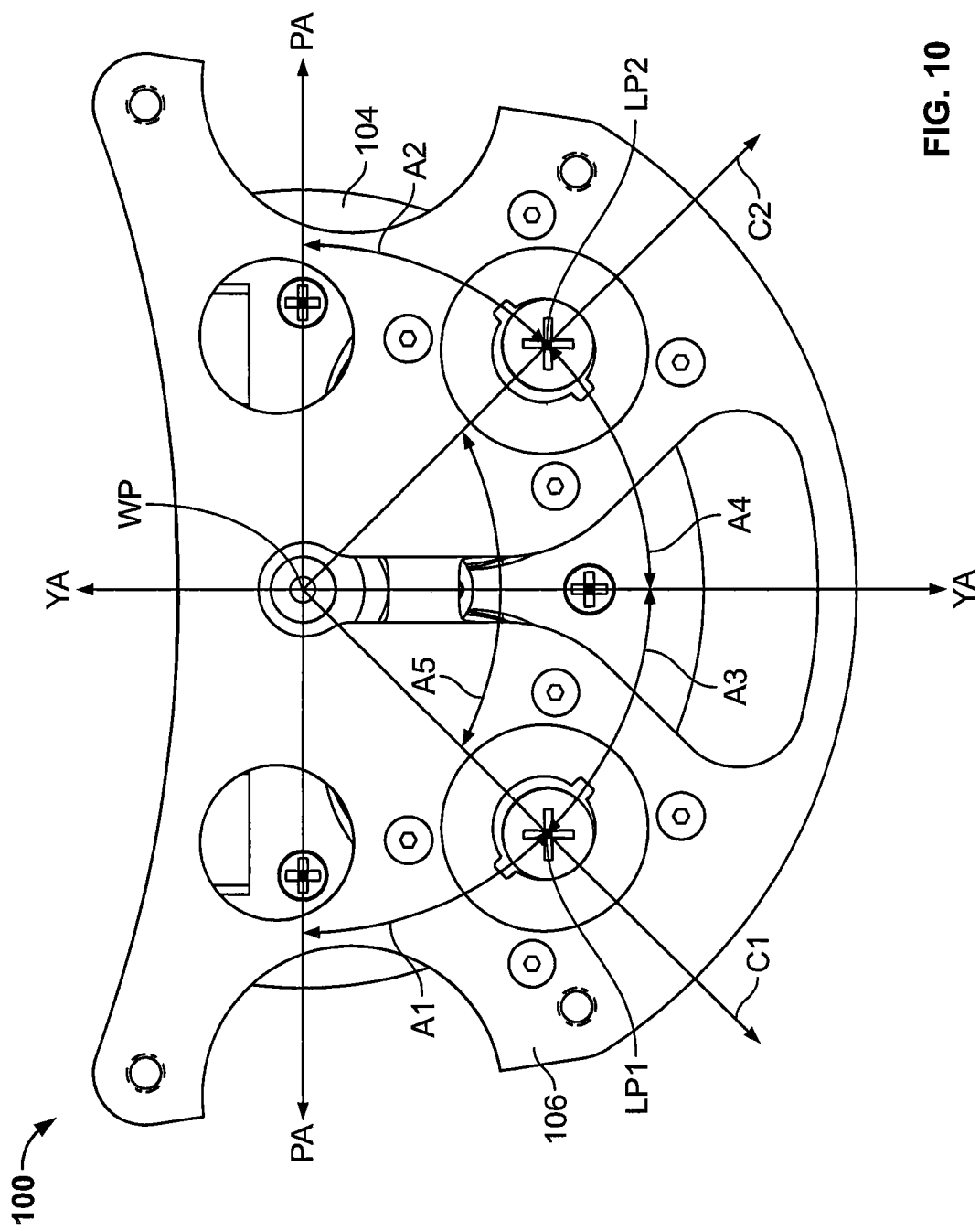
FIG. 10 is a front end view of the wrist mechanism of FIG. 1 in a neutral position.
Figure 11:
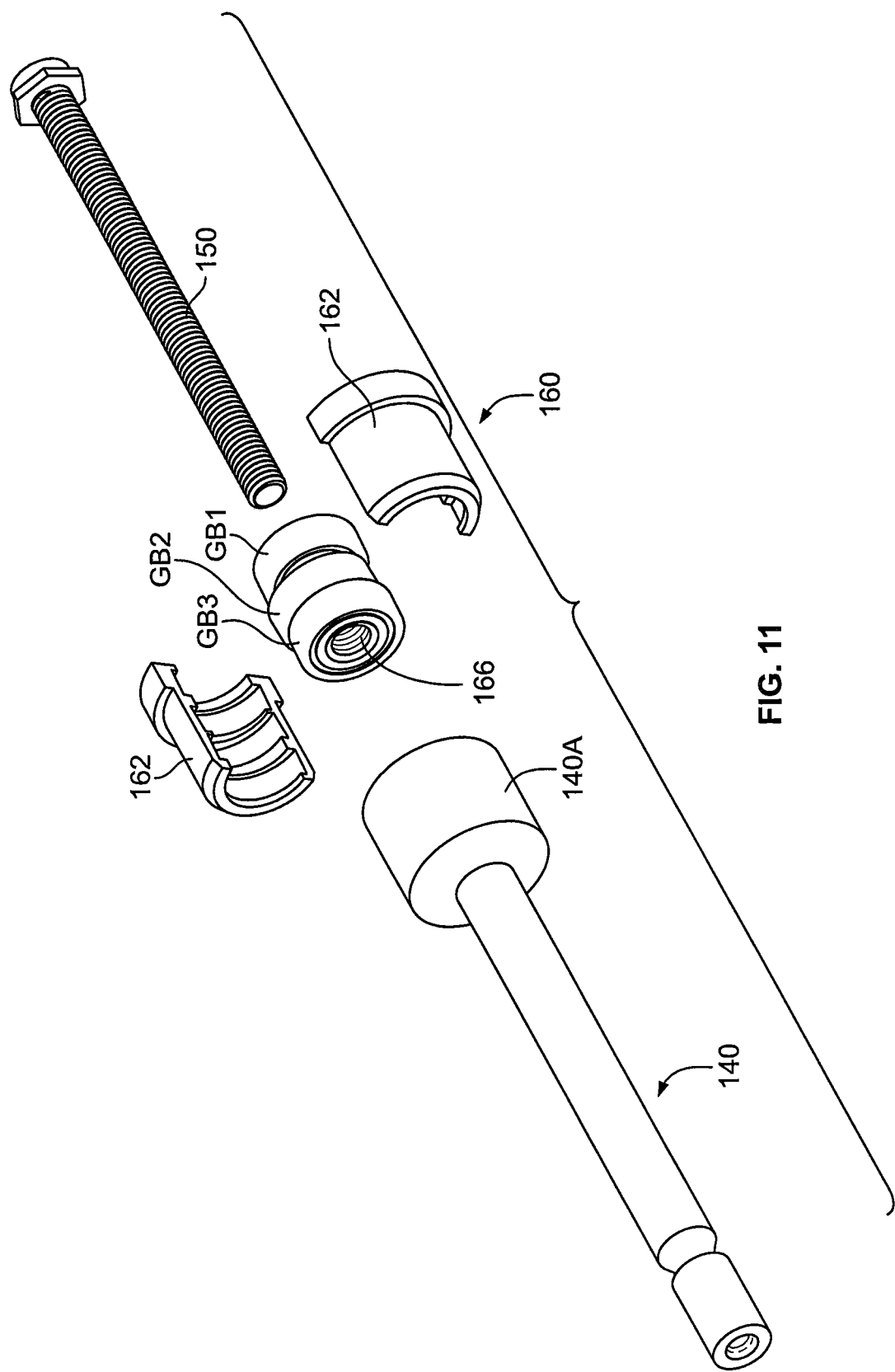
FIG. 11 is an exploded, fragmentary, front perspective view of a linear actuator forming a part of the wrist mechanism of FIG. 1.

The bone link distal joint 120 forms a gimbal joint between the bone link 110 and the wrist plate 106. Referring to FIGS. 7 and 10, the gimbal pivot point WP and the pivot points LP1 and LP2 of the linear actuator distal joints 116 of the linear actuators 111 and 112, respectively, are indicated therein. The gimbal pivot point WP corresponds to the effective attachment or anchor point of the bone link 110 to the wrist plate 106, which is at the hinge link member 126 of the joint 120. The pivot points LP1, LP2 correspond to the effective attachment or anchor points of the rods 140 to the wrist plate 106, which are at the centers of the balls 116A.

The gimbal pivot point WP lies on a gimbal axis G-G. A fixed pitch axis PA-PA extends perpendicularly to the gimbal axis G-G and is defined by the pivot pins 127 of the joint 120. A variable yaw axis YA-YA transversely intersects the gimbal axis G-G and extends perpendicularly to the pitch axis PA-PA and is defined by the pivot pins 129 of the joint 120. In some embodiments, the axes PA-PA and YA-YA intersect at the gimbal central axis G-G.

The wrist plate 106 can rotate about the pitch axis PA-PA in opposed pitch rotation directions PR, and can rotate about the yaw axis YA-YA in opposed yaw rotation directions YR. Pitch rotation displacement, yaw rotation displacement and combinations thereof can be executed by selectively operating the linear actuators 111, 112 to reposition and maintain the wrist plate 106, and thereby the end effector 30 as desired. More particularly, the wrist plate 106 can be rotated about the pitch axis PA-PA by extending and retracting the rods 140 of the linear actuators 111, 112 in the same direction. The wrist plate 106 can be rotated about the yaw axis YA-YA by extending and retracting the rods 140 of the linear actuators 111, 112 in different directions from one another. This configuration of the linear actuators allows for simplified control of the gimbal due to the symmetry of the actuators 111, 112. Additionally, this configuration provides a very compact wrist mechanism 100 with the primary movers located within the forearm, as in the human wrist. The configuration allows movement to approximate the movement of a human wrist bending and flexing while the bones (i.e., the rods 140 of the linear actuators 111, 112) in the forearm slide in relation to one another to complete the task of grasping and lifting a object (e.g., a jug with a handle can be lifted from a table at a height of 3 feet up onto a top shelf of a refrigerator at a height of 4 feet).

Figure 6:
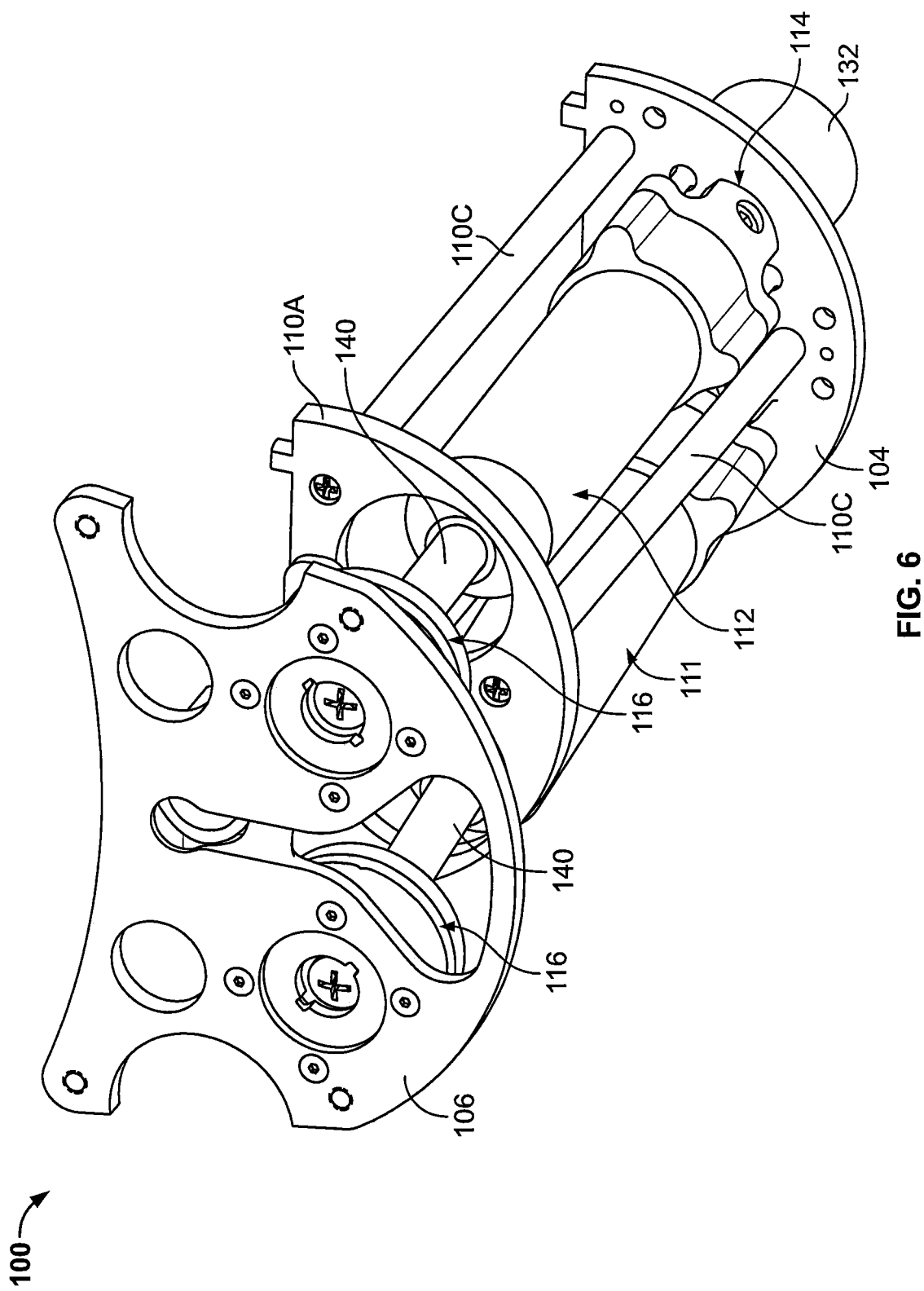
FIG. 6 is a fragmentary, front perspective view of the wrist mechanism of FIG. 1 in a neutral position.
Figure 8:
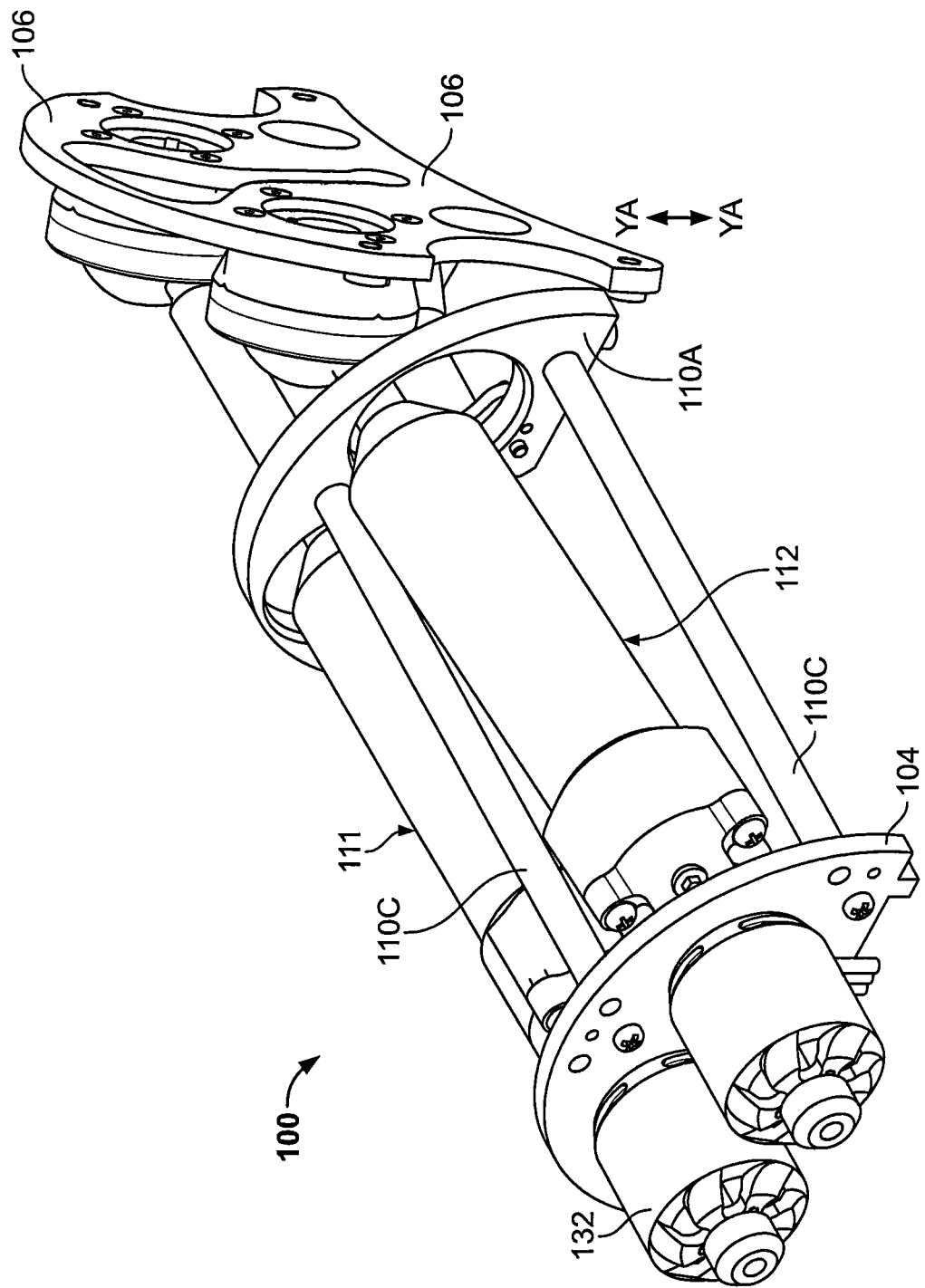
FIG. 8 is a fragmentary, rear perspective view of the wrist mechanism of FIG. 1 wherein the wrist plate is rotated about a yaw axis.
Figure 9:
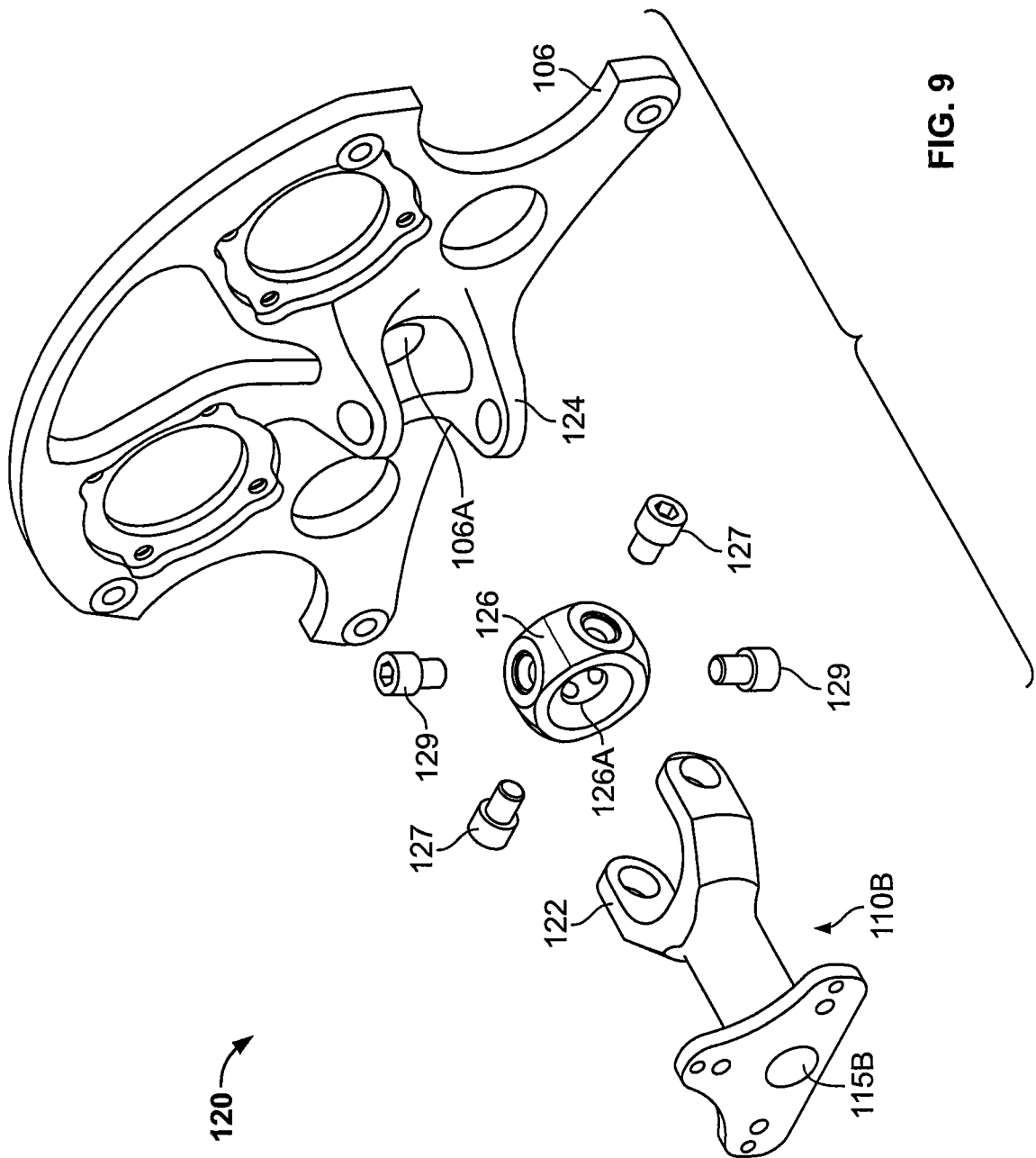
FIG. 9 is an exploded, fragmentary, rear perspective view of a wrist joint forming a part of the wrist mechanism of FIG. 1.

FIG. 6 shows the wrist mechanism 100 with the wrist plate 106 in a neutral position. FIG. 7 shows the wrist mechanism 100 with the wrist plate 106 pivoted about the pivot axis PA-PA. FIG. 8 shows the wrist mechanism 100 with the wrist plate 106 pivoted about the yaw axis YA-YA.

Referring to FIG. 10 a reference connecting line C1 connects the gimbal pivot point WP to the linear actuator pivot point LP1, and a reference connecting line C2 connects the gimbal pivot point WP to the linear actuator pivot point LP2. As also indicated in FIG. 10: the linear actuator pivot point LP1 is angularly offset from the pitch axis PA-PA by an offset angle A1; the linear actuator pivot point LP2 is angularly offset from the pitch axis PA-PA by an offset angle A2; the linear actuator pivot point LP1 is angularly offset from the yaw axis YA-YA by an offset angle A3; the pivot point LP2 is angularly offset from the yaw axis YA-YA by an offset angle A4; and the linear actuator pivot point LP1 is angularly offset from the linear actuator pivot point LP2 by an offset angle A5. According to some embodiments, the pitch axis PA-PA and the yaw axis YA-YA each intersect the gimbal axis G-G and, in some embodiments intersect one another at the gimbal pivot point WP. According to some embodiments and as shown, the pivot points LP1, LP2 are each angularly equidistant from the pitch axis PA-PA and the yaw axis YA-YA. According to some embodiments and as illustrated, the angular offset angles A1, A2, A3, and A4 are each about 45 degrees and, in some embodiments, are 45 degrees +/−2 degrees. The linear actuator pivot points LP1, LP2 are located on the same side of the pitch axis PA-PA and are located on opposite sides of the yaw axis YA-YA.

The configuration of the wrist mechanism 100 and, in particular, the gimbal joint 120, linear actuator pivot points LP1, LP2, and axes PA-PA, YA-YA can provide significant advantages. The 45 degree angular offsets between the pivot points LP1, LP2 and the axes PA-PA, YA-YA maintain symmetry between the linear actuators 111, 112 so that linear actuators of the same construction can be used with the same ranges of motion. This can substantially simplify the design and programming of the arm 20, as well as reduce the associated cost.

According to some embodiments, the linear actuators 111, 112 can rotate the wrist plate 106 about the pitch axis PA-PA through a range of at least +/−60 degrees (120 degrees total). According to some embodiments, the linear actuators 111, 112 can rotate the wrist plate 106 about the yaw axis YA-YA through a range of at least +/−60 degrees (120 degrees total).

The range of motion achieved by this wrist configuration is greater than the human range of motion in yaw and slightly less than human in pitch. This allows the robot arm 20 to perform tasks that maintain wrist orientation through the majority of the arm workspace. For example, the arm 20 could grasp a glass of water from a surface 21 inches off the floor and place it on a surface 70 inches off the floor while keeping the glass perfectly vertical through the entire motion. The wrist mechanism's range of motion (or work volume) may be described as "conical" rather than "pan-tilt". The main difference is that with "conical" the range of motion on one axis is dependent upon the deflection of the other axis. Because of this relationship, as the conical motion wrist is "panned" to its full extreme, the allowable displacement for the "tilt" approaches zero. The practical limit of this design (using linear actuators) may be about a +/−60 degree cone. It is advantageous to maximize this work volume as this allows the manipulator 30 to perform a wider array of tasks without being restricted. Known wrist designs that can accomplish larger ranges of motion (e.g., up to about +/−90 degrees) typically require much more complex mechanisms, thus driving up cost, complexity of interactions of moving elements and potential modes of failure. The inventive wrist can maximize the work volume for the given cost of the system.

With reference to FIGS. 5 and 11-17, one or both of the linear actuators 111, 112 may include drive nut assemblies 160 as described below. Only one linear actuator 111 will be discussed, however it will be appreciated that this description likewise applies to both linear actuators 111, 112.

The drive nut assembly 160 includes a pair of bearing holders 162 and three guide bearing assemblies GB1, GB2, GB3. The guide bearing assemblies GB1, GB2, GB3 are secured (e.g., by press-fit) in the drive portion 140A of the rod 140 by the bearing holders 162 to limit or prevent axial displacement of the guide bearing assemblies GB1, GB2, GB3 relative to the rod 140.

Each guide bearing assembly GB1, GB2, GB3 includes a bearing 164 and a guide insert 166. In some embodiments, the bearings 164 are rolling element bearings. In some embodiments, the bearings 164 are ball bearings. In other embodiments, the bearings 164 are roller bearings. The guide bearing assemblies GB1, GB2, GB3 may be constructed in substantially the same manner and therefore it will be appreciated that the description of the guide bearing assembly GB1 below likewise applies to the guide bearing assemblies GB2, GB3.

Figure 12:
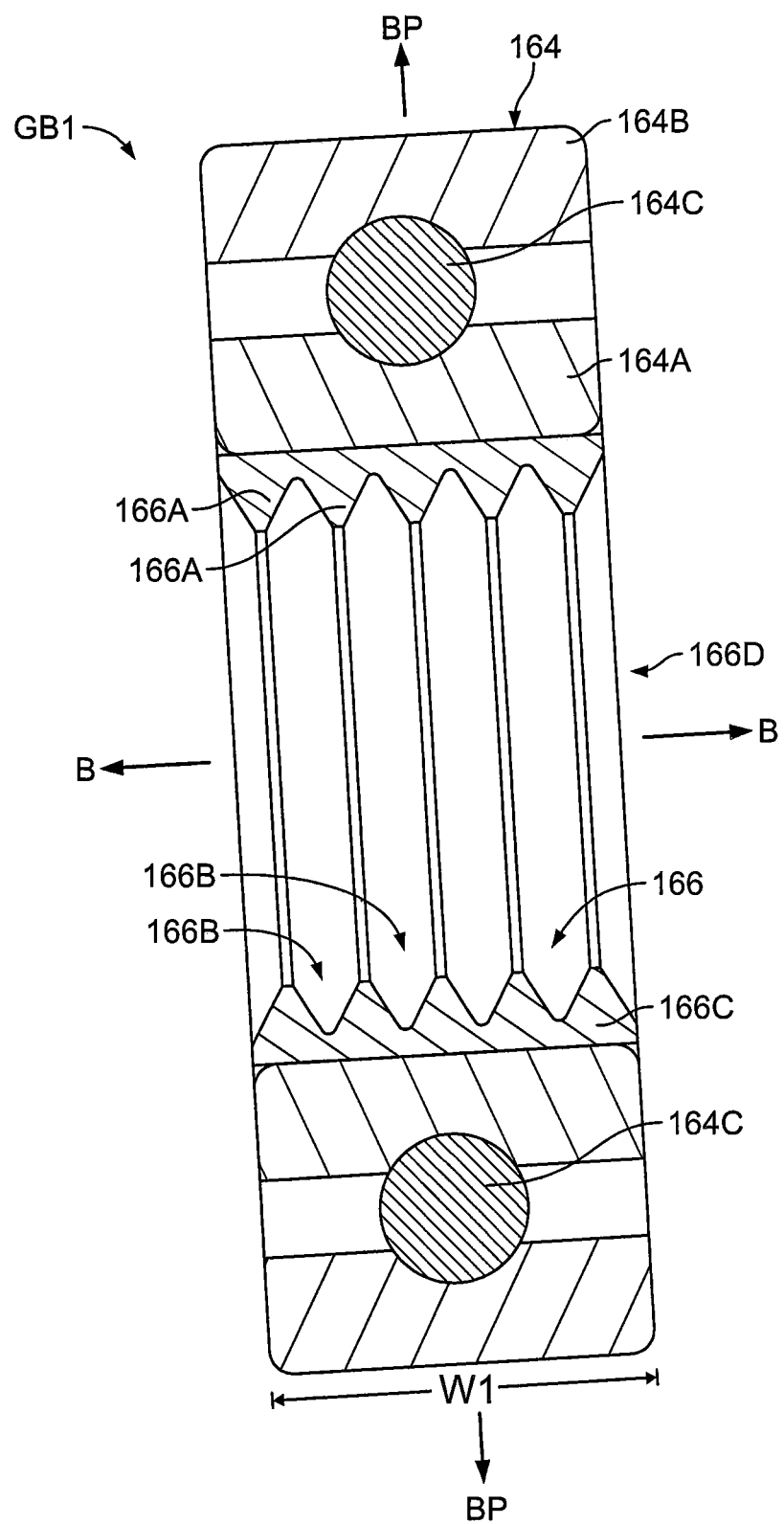
FIG. 12 is a cross-sectional view of a guide bearing assembly forming a part of the linear actuator of FIG. 5.

With reference to FIG. 12, the bearing 164 includes an annular inner race 164A, a concentric annular outer race 164B, and a plurality of balls 164C rollably captured radially between the races 164A, 164B. The inner race 164B can rotate relative to the outer race 164A about a bearing rotation axis B-B with relatively low frictional resistance. The bearing 164 may be of a conventional design.

The guide insert 166 includes an annular insert body 166C mounted on the inner diameter of the inner race 164A for rotation therewith. The insert body 166C may be secured or affixed to the inner race 164A using any suitable technique such as press-fit, adhesive, fastener(s), or interlocking features. The guide insert 166 further includes a plurality of annular guide ribs 166A on the inner diameter of the body 166C. The ribs 166A are circular and discrete (i.e., are not linked or connected end to end in the manner of a continuous screw thread) and define circular grooves 166B therebetween. The ribs 166A and grooves 166B are centered about the bearing axis B-B. In some embodiments and as shown, the ribs 166A extend in planes parallel to one another and orthogonal to the bearing axis B-B. In other embodiments, the ribs 166A and grooves 166B may be integrally formed in the inner diameter of the inner race 164B. Each guide insert 166 defines a through passage 166D concentric with the axis B-B of the associated bearing 164.

Figure 13:
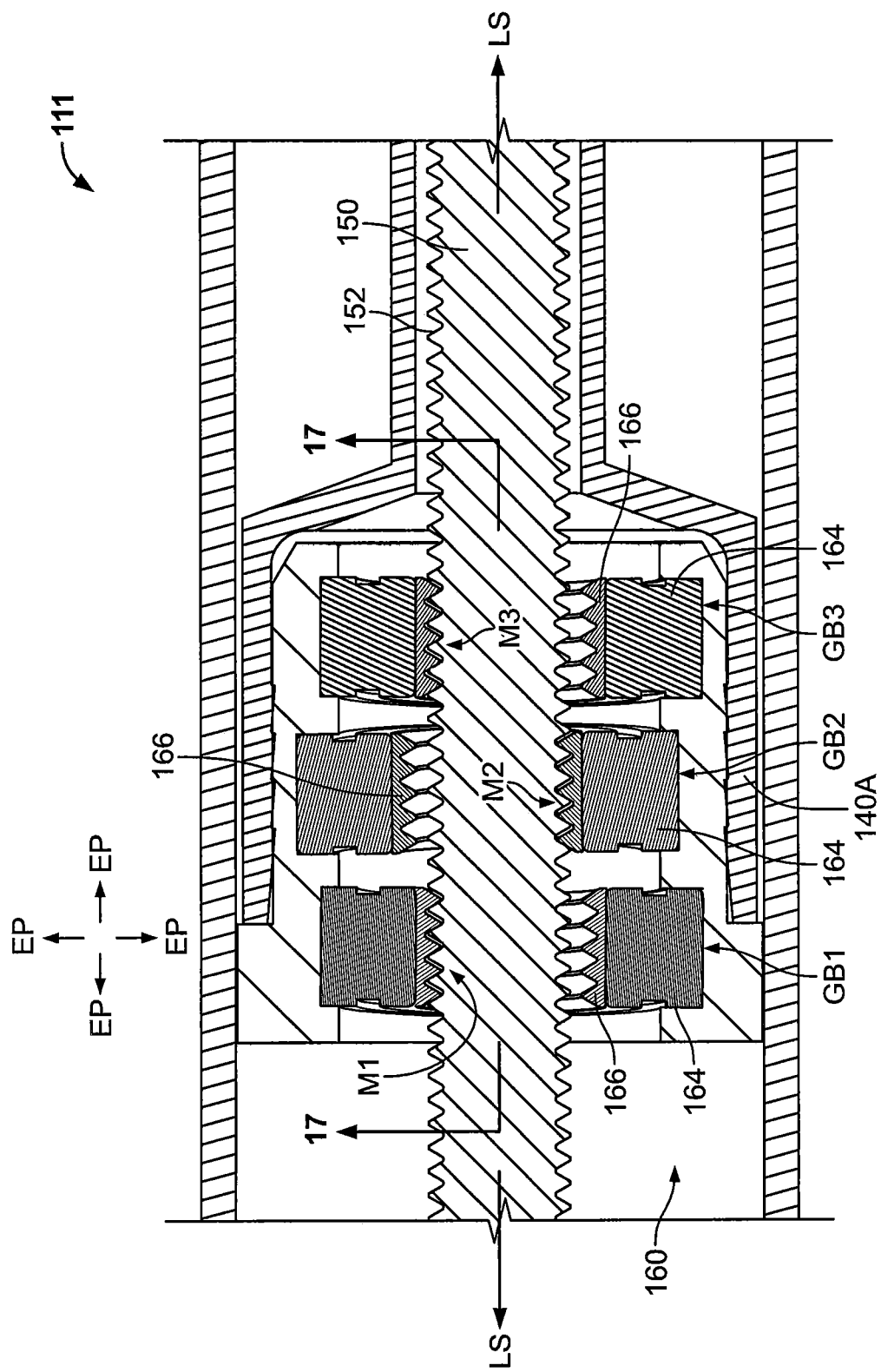
FIG. 13 is an enlarged, fragmentary, cross-sectional view of the linear actuator of FIG. 5 taken along the line 13-13 of FIG. 16.
Figure 15:
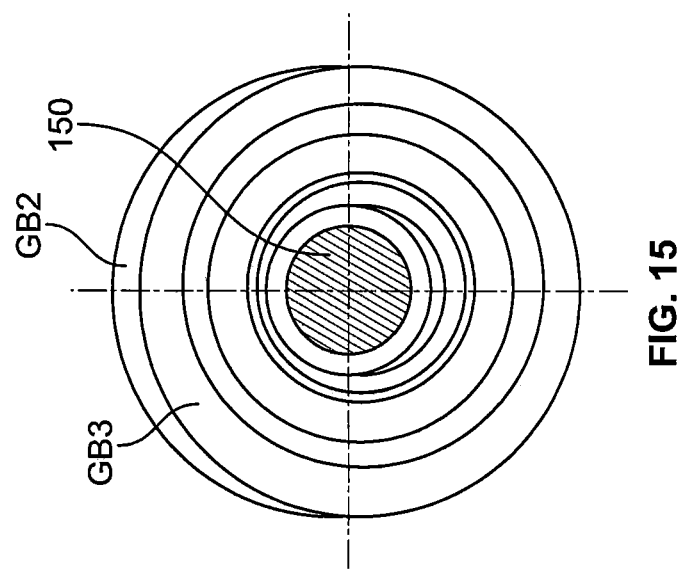
FIG. 15 is an enlarged, fragmentary, end view of the linear actuator of FIG. 5.
Figure 14:
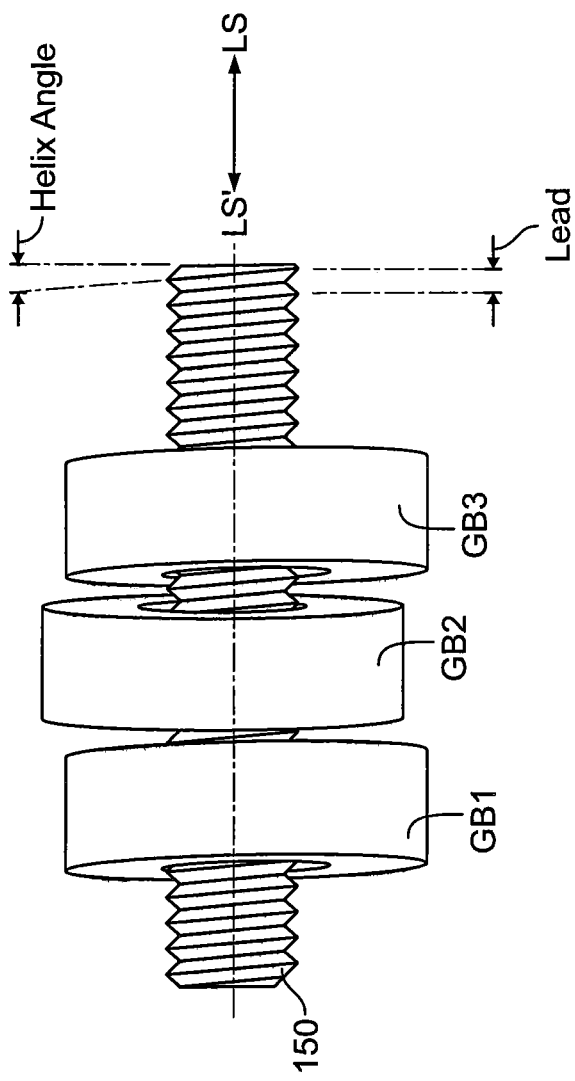
FIG. 14 is an enlarged, fragmentary, top view of the linear actuator of FIG. 5.
Figure 16:
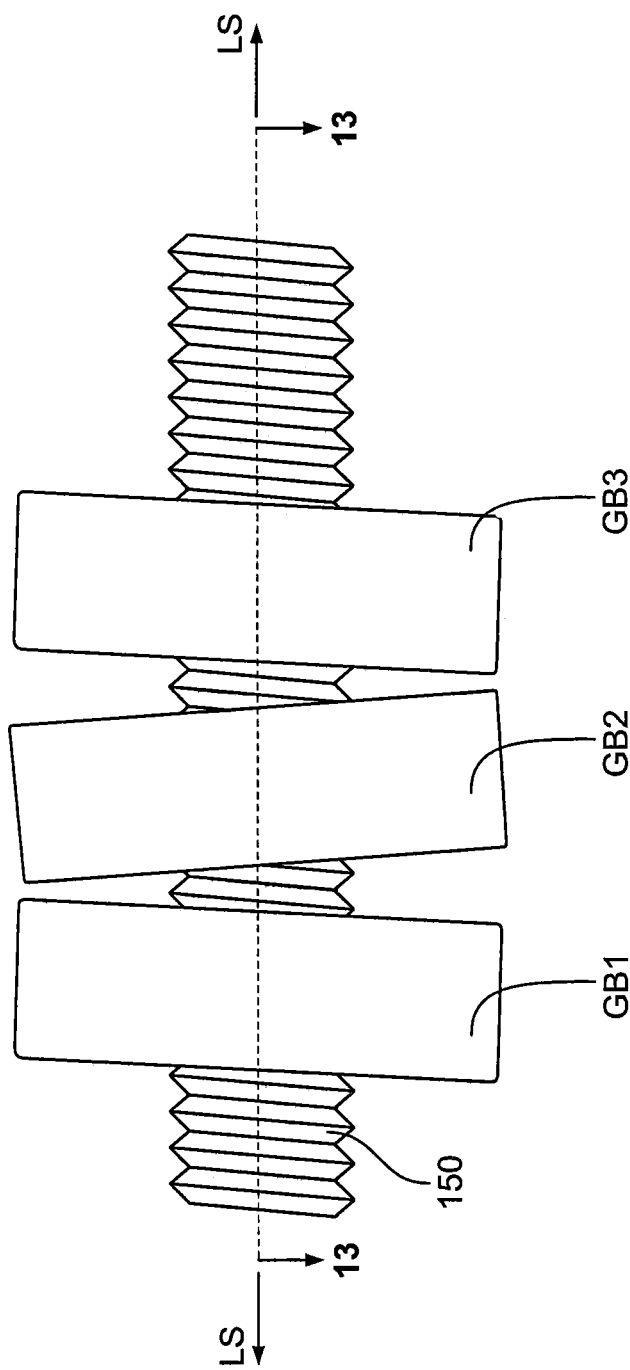
FIG. 16 is an enlarged, fragmentary, side view of the linear actuator of FIG. 5.
Figure 17:
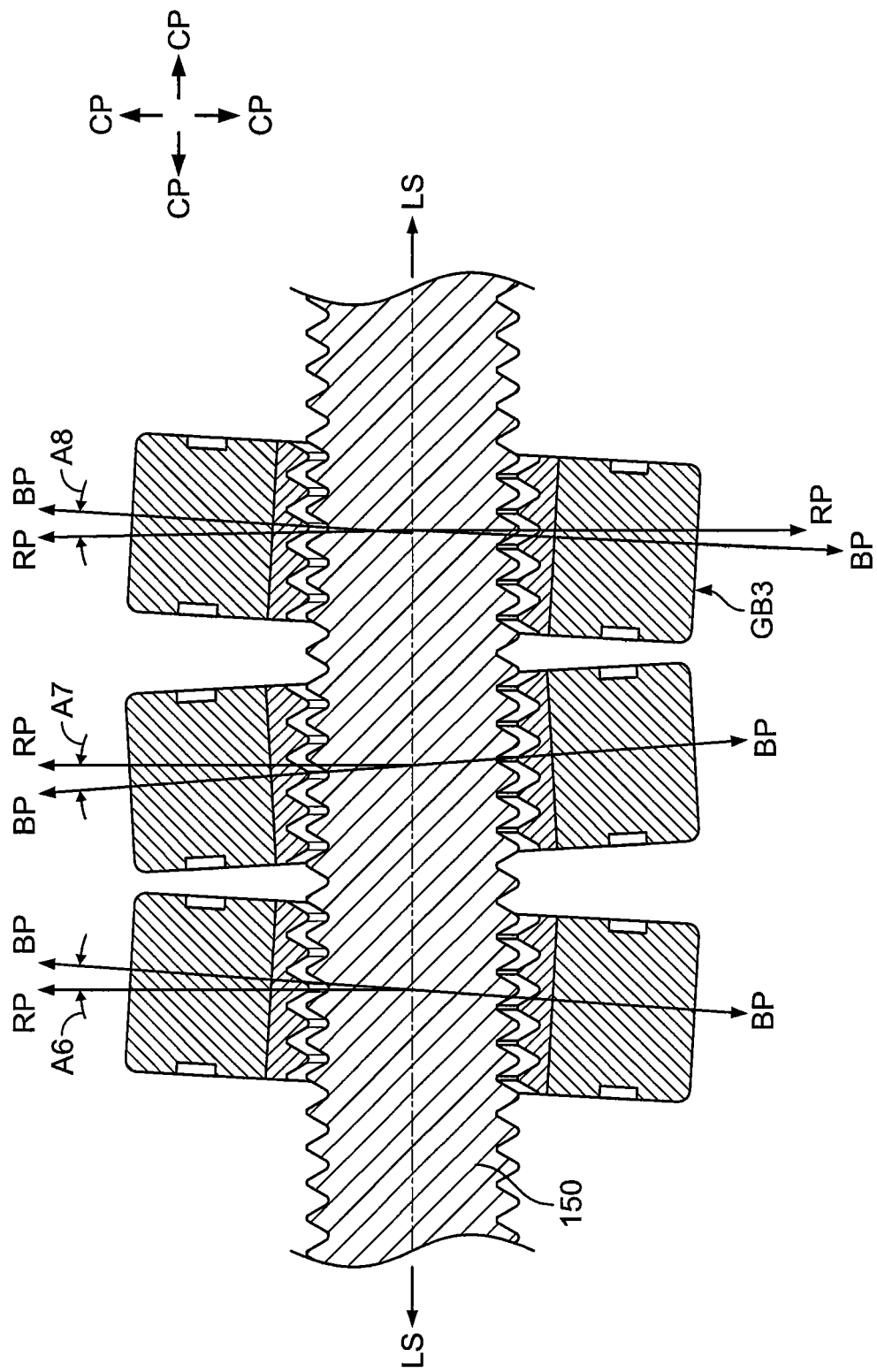
FIG. 17 is an enlarged, fragmentary, cross-sectional view of the linear actuator of FIG. 5 taken along the line 17-17 of FIG. 13.

The guide bearing assemblies GB1, GB2 and GB3 are serially mounted on the lead screw 150. With reference to FIG. 13, the guide inserts 166 of the guide bearing assemblies GB1, GB2 and GB3 engage and mate with the thread 152 of the lead screw 150 at engagement regions M1, M2 and M3, respectively. As can be seen in FIGS. 13-17, the axes B-B of the bearings 164 are not concentric with the longitudinal axis LS-LS of the lead screw 150. Referring to FIG. 13, the axes B-B of the guide bearing assemblies GB1, GB2, GB3 are alternatingly laterally offset from the axis LS-LS so that the engagement regions M1, M3 of the assemblies GB1, GB3 are located on one lateral side of the lead screw 150 and the engagement region M2 of the assembly GB2 is located on the opposite lateral side of the lead screw 150. The engagement regions M1, M2, M3 define an engagement plane EP-EP (FIG. 13) in which the axis LS-LS lies. In some embodiments, the guide inserts 166 of the guide bearing assemblies GB1, GB2 and GB3 only engage the lead screw 150 at engagement regions M1, M2 and M3, and are otherwise spaced off from the lead screw 150 (e.g., as shown in FIG. 17).

A cant plane CP-CP (FIG. 17) in which the axis LS-LS also lies extends orthogonally to the engagement plane EP-EP. The engagement plane EP-EP is perpendicular to the cant plane CP-CP, and the planes EP-EP and CP-CP intersect on the axis LS-LS. The midplanes of the three guide bearing assemblies GB1, GB2, GB3 are coincident to the engagement plane EP-EP, and are alternately shifted above and below the cant plane CP-CP. The guide bearing assemblies GB1, GB2, GB3 (and, hence, their axes B-B) are each tilted, inclined or canted relative to the lead screw axis LS-LS in the cant plane CP-CP. More particularly, the planes of rotation BP-BP (orthogonal to the respective axes B-B) of the guide bearing assemblies GB1, GB2 and GB3 form oblique cant angles A6, A7 and A8, respectively, with the axis LS-LS in the cant plane CP-CP (FIG. 17). The cant angle A6, A7, A8 of each guide bearing assembly GB1, GB2, GB3 is the angle formed between the axis BP-BP of the guide bearing assembly and the plane of rotation RP-RP of the lead screw 150 (which is orthogonal to the lead screw axis LS-LS). The cant angle A7 of the inner assembly GB2 is oriented in the opposite axial direction from the cant angles A6, A8 of the outer assemblies GB1, GB3.

In use, the lead screw 150 is rotated about its axis LS-LS as discussed above to extend and retract the rod 140. The guide ribs 166A are mated with the thread 152 such that the rotation of the lead screw is converted to axial thrust in the direction E or F corresponding to the direction of rotation.

As the lead screw 150 is rotated, the inner races 164A, and thereby the guide inserts 166 and ribs 166A, can rotate freely or with very low frictional resistance with respect to the rod 140. The bearings 164 may greatly decrease or substantially eliminate the friction that would occur between the thread 152 and the insert ribs 166A if the ribs 166A were rotationally fixed relative to the rod 140. As a result, the frictional losses imposed on the lead screw 150 are reduced and less power and torque are required to operate the linear actuator 111. This improved efficiency may reduce the required cost and size of the arm 20.

The guide ribs 166A positively engage, mate or interlock with the lead screw thread 152. As a result, the drive nut assembly 160 can apply greater drive force to the lead screw 150 without slipping. Because the ribs 166A positively interlock with the lead screw thread 152, it is not necessary to laterally load the inserts 166 against the lead screw 150 in order to maintain contact and effective drive engagement. In some embodiments and as illustrated, the ribs 166A are substantially complementary to the lead screw thread 152 in the engagement plane EP-EP.

Advantageously, the circular configuration of the guide ribs 166A maintains the effective pitch of the lead screw 150.

The canting of the guide bearing assemblies GB1, GB2, GB3 relative to the lead screw 150 enables the guide inserts 166 to better mate with the thread 152, thereby increasing the load that can be transmitted without deforming the thread 152.

In some embodiments, the sizes of the cant angles A6, A7, A8 are substantially the same. In some embodiments, the cant angles A6, A7, A8 are each less than or equal to about 45 degrees, and in some embodiments are each in the range of from about 2 degrees to 45 degrees. However, the cant angles A6, A7, A8 may approach zero for very fine threads on a large diameter lead screw. In some embodiments, the cant angles A6, A7, A8 are each set as a function of the helix angle of the helical lead screw thread 152. In some embodiments, the cant angles A6, A7, A8 are each set substantially the same as the average helix angle of the lead screw thread 152 (FIG. 14), which is determined by the following formula:

$$\text{Helix angle} = \tan^{-1}\left(\frac{\text{lead screw lead}}{\pi D_{ave}}\right)$$

Where:

$$D_{ave} = (\text{Lead screw thread outer diameter}) - \left(\frac{\text{lead screw lead}}{2}\right)$$

For example, in some embodiments, the lead screw 150 is an M6×1 screw and the cant angles A6, A7, A8 are each 3.3 degrees (+/−0.5 degrees).

By canting the inserts 166 in opposite directions and as a function of the lead screw helix angle, the insert 166 of the inner assembly GB2 is aligned with the helix angle of the lead screw thread 152 on the side of the lead screw 150 it mates with, and the insert 166 of the outer assemblies GB1, GB3 align with the thread 152 on the opposing side of the lead screw 150 they mate with.

In some embodiments, each insert 166 has a plurality of circular ribs 166A and, in some embodiments, in the range of from 3 to 20 circular ribs 166A. However, in some embodiments, each insert 166 may include only a single rib 166A. In some embodiments, the width W1 (FIG. 12) of each insert 166 will substantially equal the number of ribs 166A times the pitch of the lead screw thread 152. The insert 166 may be wider or narrower than the bearing 164.

While three bearing assemblies GB1, GB2, GB3 are provided in the exemplary drive nut assembly 160, any number of bearing assemblies may be incorporated in the drive nut assembly (even just one bearing assembly as long as the parts are constrained to keep the threads and grooves engaged). However, three bearing assemblies as shown may provide a particular advantage of achieving adequate load capacity and minimizing cost.

In some embodiments, the inner diameter of the ribs 166A is greater than the outer diameter of the lead screw thread 152. However, this is not required. The inner diameter of the insert 166 may be the same as or slightly smaller than the outer diameter of the screw 150. The main constraint is that the insert grooves 166B should not interfere with the lead screw threads 152 when mated at the helix angle. It is beneficial to keep the diameter of the insert as small as possible as this increases the contact area between the threads and the grooves, thus increasing the load capacity that can be transmitted between the bearing assemblies GB1, GB2, GB3 and the screw 150.

In alternative embodiments, the ribs 166A of one or more of the inserts 166 may be replaced with a helical thread.

A wrist mechanism as described herein can provide improved or optimized manipulator performance for a given cost. For the wrist, the optimal morphology is to have some type of two-axis "gimbal" as this most closely mimics the human wrist (as opposed to "stacking" rotary actuators). To actuate this gimbal, three options may be considered: 1) linear actuator; 2) rotary actuator via a pushrod; or 3) tendons. The rotary actuator approach may suffer from high component costs (as it would require the most parts), and the tendon approach may require relatively high assembly labor (as it is time-consuming to install, route, and preload tendons). The linear actuator approach may also provide advantages in packaging by consuming less volume in the forearm, thus leaving half or more of the volume for housing other components such as electronics.

Typical linear actuator options include generic lead screw/nut, ball screw, conventional roller screw, or Uhing drive. The generic lead screw/nut is typically the cheapest solution, but suffers from substantial inefficiency (typically 10-30%) because of the sliding contact between the nut and screw threads (which has a typical friction coefficient between 0.1-0.3). This creates an array of problems such as requiring a large motor to achieve a desired force output, and stick-slip vibration issues when trying to lower loads. All of the other options mentioned above have "rolling contact" between the lead screw and nut, which greatly increases their efficiency (upwards of 90% for some variants, hence making them all backdriveable), but they too have drawbacks. The ball screw not only is expensive to manufacture, but the size of the balls inherently limits how fine a pitch can be accommodated and thus limits the effective gear ratio that can be achieved in a single stage. Conventional roller screws have higher load capacity than ball screws, can accommodate finer pitch, and can use standard lead screws, but the nut portion is even more expensive to manufacture due to higher complexity. Uhing drives operate by pushing canted bearings against a "smooth" shaft (i.e., no lead screw) which gives them the benefit of having variable lead, but have the lowest load capacity of all the linear options, lower efficiency than ball or roller screws (due to the required high radial load on the bearings), are subject to slippage (which complicates encoding), and also are costly due to the nut complexity to preload the bearings against the shaft.

The inventive linear actuator driven wrist mechanism 100, which uses grooved guide inserts 166 within low-friction bearings to interface with a standard lead screw, achieve benefits offered by the other aforementioned techniques (such as high efficiency, fine pitch, positive engagement with the lead screw, reasonable load capacity, etc.) within an easily manufacturable package. The inventive linear actuator therefore is less expensive and more effective and efficient than other options. The inventive actuator design combined with the inventive wrist gimbal can provide very good performance in regards to high efficiency, good load capacity, smooth operation, large range of motion, etc., for a relatively low cost compared to other potential wrist designs. For example, in some embodiments, the load capacity of the drive nut assembly 160 is at least about 30 percent of the load capacity of the lead screw 150. Moreover, the inventive actuator design can improve wrist dexterity and movement response in real time, and provide backdrivability.

With reference to FIG. 3, the electrical system 60 includes an electrical component 62 mounted on the wrist plate-side of the wrist joint 120, an electrical component 64 mounted on the forearm-side of the wrist joint 120, and a flexible electrical power and/or data transmission cable 66. In some embodiments, the electrical component 62 includes a controller integral with or electrically connected to the end effector 30. In some embodiments, the electrical component 62 includes a printed circuit board (PCB). In some embodiments, the electrical component 64 includes a controller integral with or electrically connected to the remainder of the arm 10 or the torso 12. In some embodiments, the electrical component 64 includes a PCB.

As discussed above, the bone link distal joint 120 includes openings 106A, 126A, 115A extending through the wrist plate 106A, the outer clevis 124, the hinge link member 126 and the inner clevis 124, and the bore 115 extends fully through the bone link connecting portion 110B. The cable 66 is routed from the electrical component 62, through the openings 106A, 126A, 115A, and to the electrical component 64. The cable 66 may be terminated on one end at a connector 62A on the electrical component 62 and on its other end at a connector 64A on the electrical component 64.

In use, the cable 66 serves to transmit power and/or data between the electrical components 62, 64. Because the cable 66 passes through the universal joint 120 substantially at or proximate the center of the universal joint 120 and the center of the gimbal pivot point WP, the cable 66 is deflected relatively little throughout the range of motion of the wrist plate 106. Therefore, only a small amount of slack length must be provided in the cable 66, wear on the cable 66 can be reduced, and the cable 66 is protected from snagging and abrasion from contact with the surroundings.

With reference to FIGS. 1, 2 and 18-20, the arm 20 includes a shoulder base 200, an inner shoulder joint 202, a shoulder arm link 204, an outer shoulder joint 206, an upper bicep arm link 210, a bicep joint 212, a lower bicep arm link 214, an elbow joint 216, an upper forearm arm link 220, a forearm joint 222, and a lower forearm arm link 224. The joints 202, 206, 212, 216, and 222 are configured to permit the arm links coupled thereby to rotate about a roll axis J1-J1, a pitch axis J2-J2, a roll axis J3-J3, a pitch axis J4-J4, and a roll axis J5-J5, respectively.

Each arm link 200, 204, 210, 214, 220, 224 includes a generally tubular shell 230 defining an interior shell cavity 234. Each shell 230 includes a pair of opposed clam shell members 232 collectively defining the cavity 234. The clam shell members 232 may be secured together by any suitable technique and, in some embodiments, by fasteners (e.g., screws). The shell 230 of each arm link 200, 204, 210, 214, 220, 224 further includes an integral joint feature or features 236, 240/242, or 248.

The clams shell members 232 may be formed of any suitable material. According to some embodiments, the clam shell members 232 are formed of a rigid or semi-rigid polymeric material. In some embodiments, the polymeric material is selected from the group consisting of Acrylonitrile Butadiene Styrene (ABS). According to some embodiments, the clam shell members 232 are formed of a material having a secant modulus in the range of from about 113,000 to 885,000 psi. According to some embodiments, the material of the clam shell members 232 has a tensile strength in the range of from about 3,500 to 10,600 psi. According to some embodiments, each clam shell member 232 is unitarily and integrally formed. According to some embodiments, the each clam shell members 232 is unitarily molded. According to some embodiments, each clam shell member 232 is unitarily injection molded. According to some embodiments, each clam shell member 232 is monolithic.

An actuator assembly 250 is disposed in each cavity 234. Each actuator assembly 250 includes a motor 252 and a gearbox 254. The gearbox 254 may include an integrated clutch and plastic gears (e.g., planetary gears). The motor 252 may be an electric motor and is configured to drive the gearbox 254, which in turn drives a keyed rotating output shaft 258. Each gearbox 254 is affixed to the shell 230 in which is mounted (e.g., by fasteners and/or mechanical interlock features) and the output shaft 258 thereof projects from the shell 230.

Figure 18:
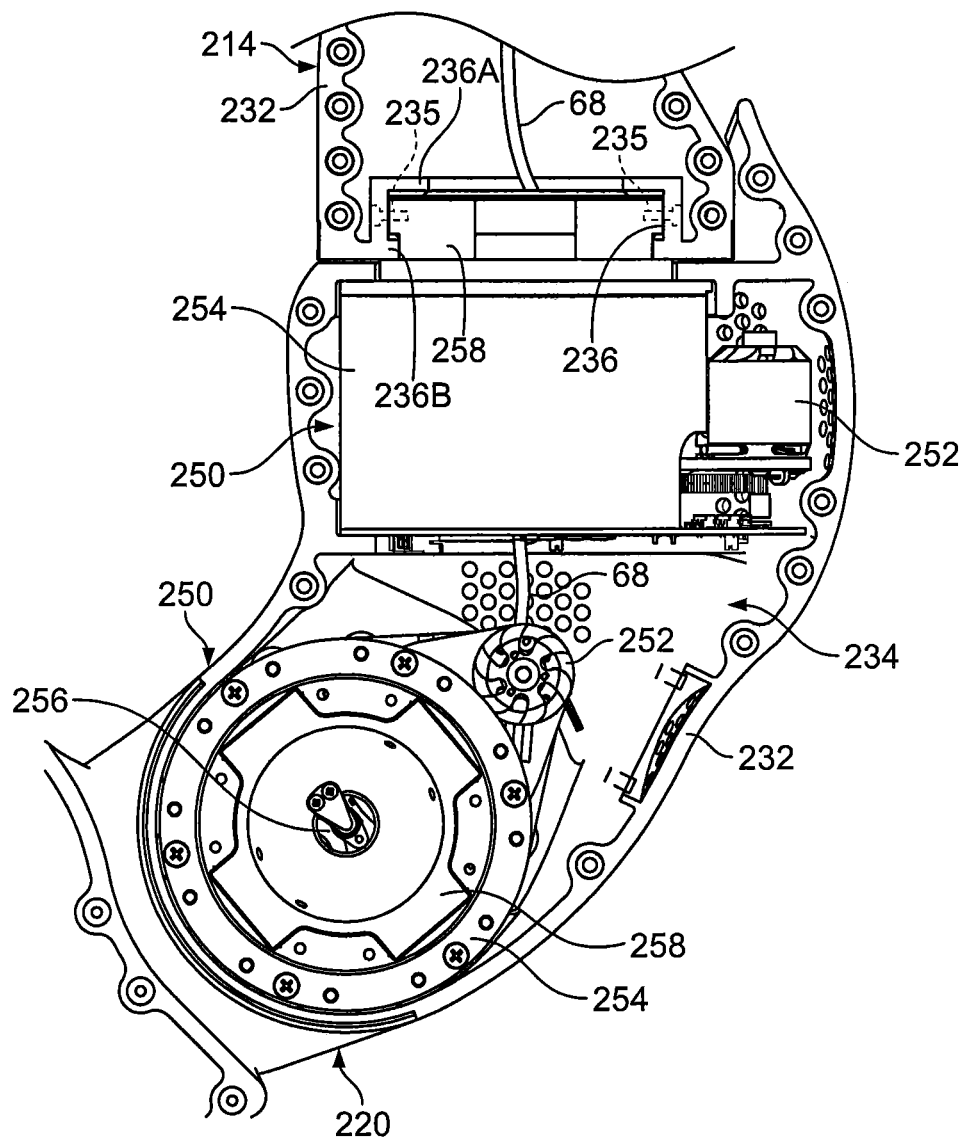
FIG. 18 is an enlarged, fragmentary, side view of the robotic arm of FIG. 1 with clamshell members thereof removed.
Figure 19:
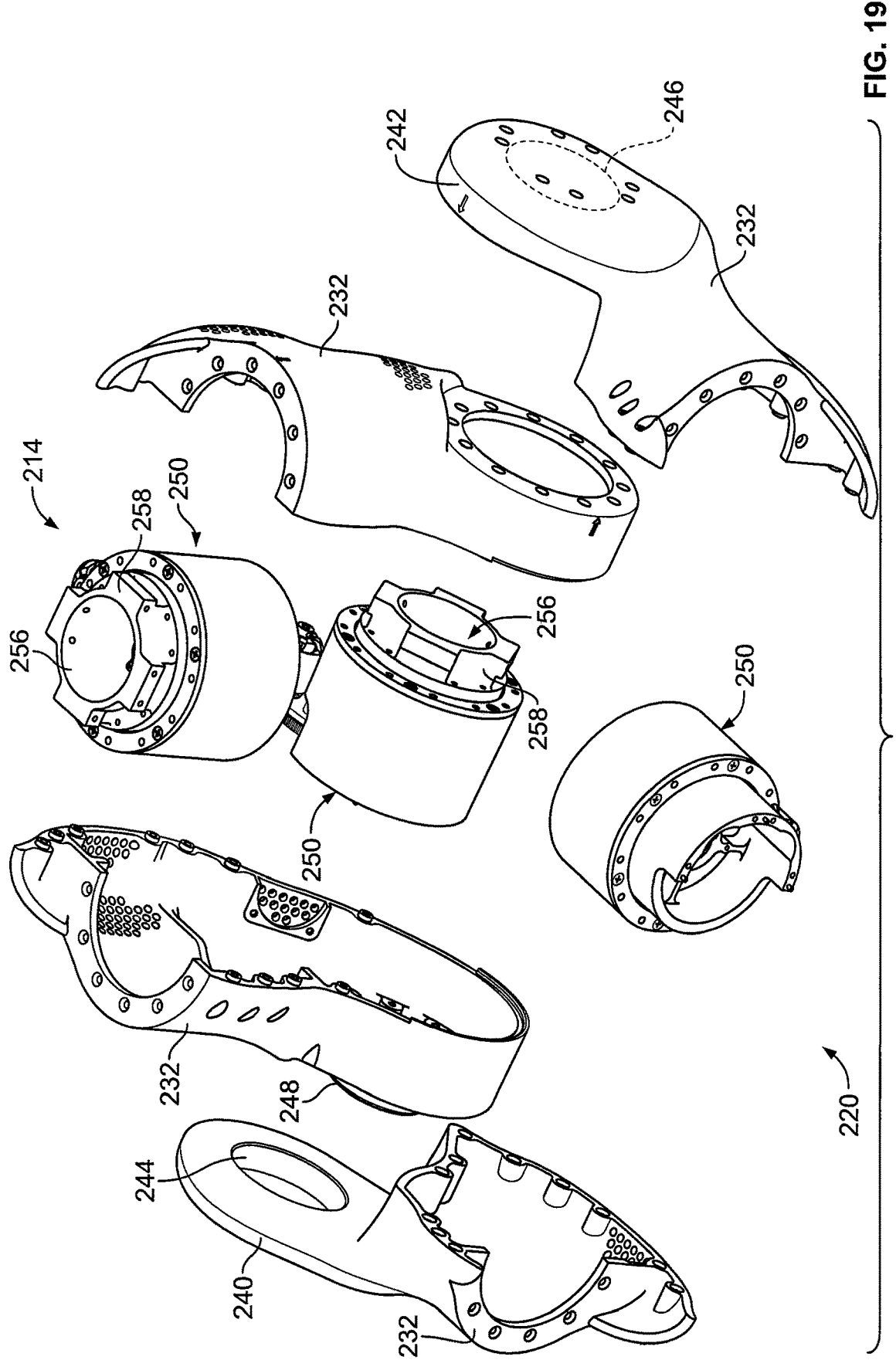
FIG. 19 is an exploded, fragmentary, perspective view of the robotic arm of FIG. 1.
Figure 20:
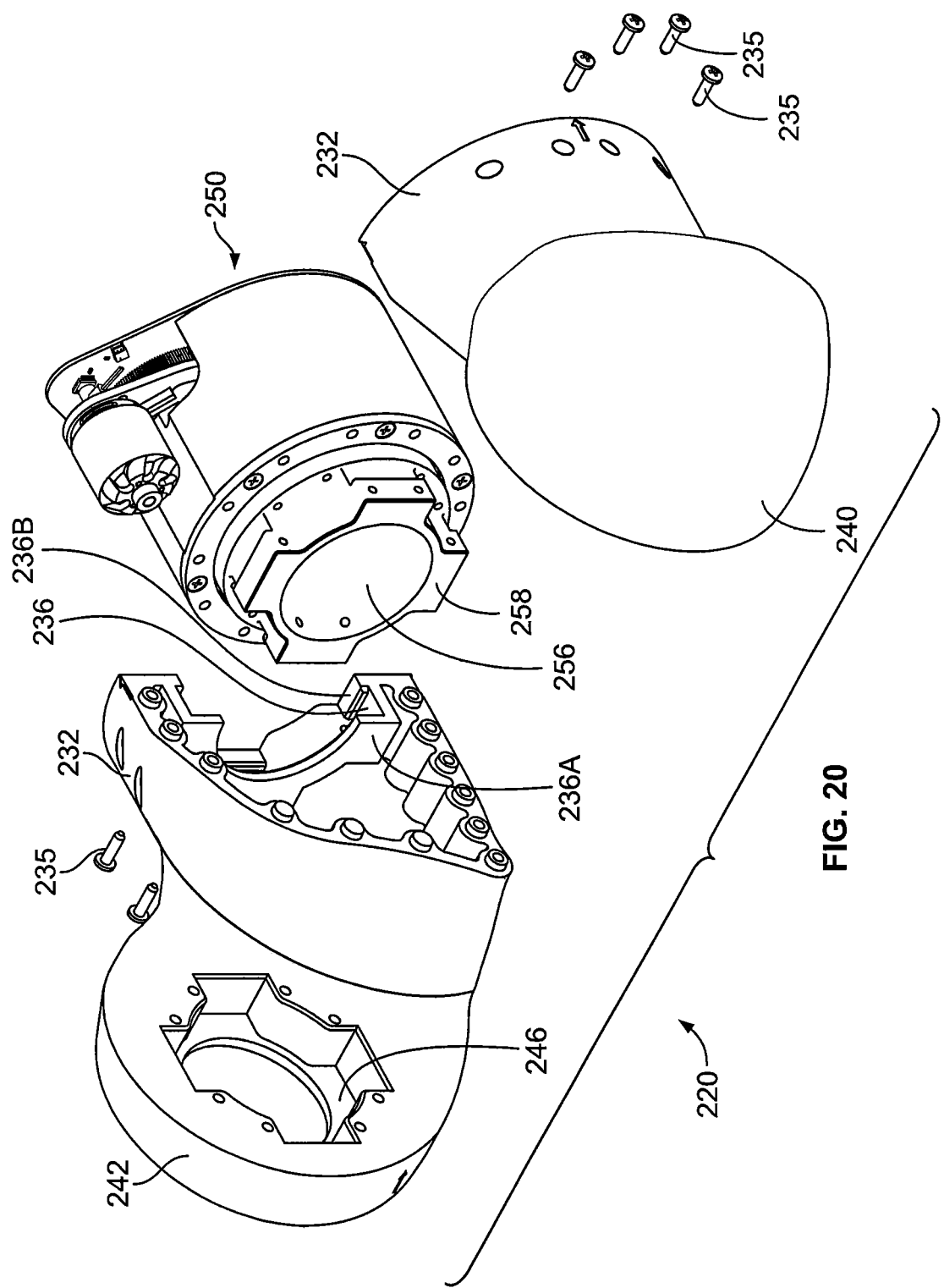
FIG. 20 is a further exploded, fragmentary, perspective view of the robotic arm of FIG. 1.

With reference to FIGS. 18-20, at the roll joints 202, 212, 222, a first arm link (e.g., arm link 210) includes a roll joint feature in the form of a keyed socket 236 and the mating second arm link (e.g., arm link 214) includes the actuator assembly 250. The output shaft 258 is seated in the socket 236. Fasteners 235 secure the first arm link to the output shaft 258 to prevent axial displacement between the output shaft 258 and the first arm link and thereby couple the two arm links. The socket 236 may be keyed in a shape complementing that of the output shaft 258. The socket 236 includes an annular, radially inwardly extending inner retention flange 236A and radially inwardly extending outer retention tabs 236B. Integral radially outwardly extending tabs 258A of the output shaft 258 are axially disposed between the flange 236A and the tabs 236B to resist or prevent axial displacement between the arm link of the socket 236 and the output shaft 258. In some embodiments, the coupling between the output shaft 258 and the adjacent arm link (i.e., by the socket 236 and fasteners 235) is the only mechanical connection between the arm links.

With reference to FIGS. 19 and 20, at the pitch joints 206, 216, a first arm link (e.g., arm link 220) includes pitch joint features in the form of laterally spaced apart hinge extensions 240, 242 and the mating second arm link (e.g., arm link 214) includes the actuator assembly 250 and a pitch joint feature in form of hinge post 248. The hinge extension 240 includes a hinge post socket 244. The hinge extension 242 includes a drive socket 246. The second arm link is seated between the hinge extensions 240, 242. The hinge post 248 is seated in the hinge post socket 244. The output shaft 258 is seated in the drive socket 246. Fasteners may secure the first arm link to the output shaft 258 to prevent lateral displacement between the output shaft 258 and the first arm link and thereby couple the two arm links. The socket 246 may be keyed in a shape complementing that of the output shaft 258. In some embodiments, the interlock between the hinge post 248 and the socket 244 and the interlock between the output shaft 258 and the socket 246 are the only mechanical connections between the arm links of the pitch joint. In some embodiments, these interlocks are supplemented by fasteners securing the output shaft 258 in the socket 246.

The arm links 200, 204, 210, 214, 220, 224 collectively serve as a repositionable (about joints 202, 206, 212, 216, 222) load bearing frame for supporting a load on the distal end of the arm 20 (e.g., a load supported or held by the end effector 30). According to some embodiments and as illustrated, the shells 230 of the arm links 200, 204, 210, 214, 220, 224 are each load bearing members that each bear substantially the entire load supported by or applied to the distal end 20B of the arm 20, there being no additional, supplemental or internal frame or underlying mechanical structure (e.g., a metal frame) supporting the arm 20. That is, there is no supplemental frame that connects the distal and proximal end joints of a given arm link to one another (i.e., to carry a load across the span of the arm link) and interconnects the arm links. As a result, the cost, weight and space required for a supplemental internal frame or skeleton is avoided.

The geometric configuration of the tubular arm links 200, 204, 210, 214, 220, 224 can provide improved strength while remaining relatively lightweight. The shell 230 forms the outer part of each arm link so that its outer diameter is enlarged or maximized, which in turn provides greater torsional and bending stiffness and strength. Utilizing the shells 230 as the load bearing members as well as the protective covering maximizes the strength of the load bearing member. This configuration increases the potential payload of the arm by eliminating the additional structural weight required to include a structural central "bone". Additionally, eliminating the need for a central "bone" structure leaves central volume available to route cabling, house actuators, and protect electronics.

In one implementation, the robotic arm 20 has a shoulder offset length K1 of 195 mm as measured from the interface of the shoulder base 200 and robot torso 12 to the uppermost pitch axis J2-J2, an upper arm length K2 of about 291 mm as measured from the upper most pitch axis J2-J2 to the lower pitch axis J4-J4, a forearm length K3 of about 372 mm as measured from the lower pitch axis J4-J4 to the center of the wrist plate 106, an actuator assembly diameter K4 of about 103 mm and weighs about 17 pounds. In this implementation, the robotic arm 20 may be capable of lifting and holding at least an eight pound weight at full arm extension and may be capable of curling at least 15 pounds of weight. In implementations, an arm 20 of these dimensions and materials can lift more than 20 pounds of weight straight up from a horizontal surface and curl more than 30 pounds of weight. In implementations, the arm 20 may be scaled and the lift capacity of the arm 20 will scale accordingly. For example, in one implementation, reducing the arm 20 to dimensions half those listed above would reduce the lift capacity and curl capacity by half as well and doubling the dimensions would increase the lift capacity and curl capacity at least by a factor of two.

The pitch joints 206, 216 use opposed outer hinge extensions 240, 242, each interlocked with a hinge post 248 or an output shaft 258, to provide these joints with greater torsional rigidity.

With reference to FIGS. 2 and 18-20, each actuator assembly 250 is provided with a central pass-through hole 256 extending through the center of the gearbox 254 and the output shaft 258. A flexible power and/or data transmission cable 68 is routed through each pass-through hole 256. Because the hole 256 is substantially coaxial with the axis of rotation of the associated joint, only a small amount of cable slack is required to prevent over tensioning of the cable during the bending of the joint in its intended range of movement. Additionally, the central pass through eliminates the requirement of a large cable service loop to achieve full joint range of motion, protects the cables from failure due to cyclical large straining, and provides protection from contact with gears or other moving elements. In some embodiments, the diameter of each pass-through hole 256 is in the range of from about 12 to 16 mm. A larger pass-through hole 256 may be accommodated by reducing the gear ratio and/or enlarging the gear box outer diameter. The pass-through hole 256 may accommodate an absolute encoder, which may serve to determine an output position past a slip-clutch of the gearbox 254.

The foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A robot comprising:
    a support;
    a movable member coupled to the support by a universal joint, the universal joint including:
        a first yoke attached to the movable member and including a first opening extending therethrough;
        a second yoke connected to the support and including a second opening extending therethrough; and
        a hinge link member pivotally coupled to the first yoke for relative rotation about a first hinge axis and pivotally coupled to the second yoke for relative rotation about a second hinge axis perpendicular to the first hinge axis, the hinge link member including a third opening extending therethrough; and
    a power and/or data transmission cable extending from the movable member through the first, second and third openings to the support.

2. The robot of claim 1 wherein the first and second yokes each include a clevis pivotally attached to the hinge link member.

3. The robot of claim 1 wherein:
    the second yoke includes a tubular, elongate connection portion integral with the second yoke and extending from the second yoke to the support; and
    the cable extends through the connection portion.

4. The robot of claim 1 wherein the cable terminates at an electrical component mounted on the movable member and at an electrical component mounted on the support.

5. The robot of claim 1 wherein the power and/or data transmission cable is a flexible electrical power cable.

6. The robot of claim 1 wherein the power and/or data transmission cable is a flexible data transmission cable.

7. The robot of claim 1 wherein the support is a wrist plate.

8. The robot of claim 1 wherein the first yoke, the second yoke, and the hinge link together form a gimbal joint.

9. The robot of claim 1 wherein the movable member is a bone link.

10. The robot of claim 2 wherein the clevis of the of the first yoke is pivotally attached to the hinge link member by a first pair of pivot pins, and wherein the clevis of the of the second yoke is pivotally attached to the hinge link member by a second pair of pivot pins.

11. The robot of claim 7 wherein the universal joint operates as a wrist joint about which the wrist plate is pivotable.

12. The robot of claim 7 wherein the second yoke is integrally formed with the wrist plate.

13. The robot of claim 9 wherein the bone link includes a midplate and a connecting member coupled to the midplate and the first yoke.

14. The robot of claim 13 wherein the bone link includes a plurality of struts each coupled to the midplate and to a motor plate.

15. The robot of claim 14 further comprising:
an actuator coupled to the motor plate and to the support.

16. The robot of claim 15 wherein the support includes a wrist plate and wherein the universal joint operates as a wrist joint about which the wrist plate is pivotable relative to the motor plate.

17. The robot of claim 16 wherein the actuator is coupled to the wrist plate by a distal joint and is coupled to the motor plate by a proximal joint.

18. The robot of claim 17 wherein the distal joint is a ball-in-socket joint.

19. The robot of claim 17 wherein the actuator is operable to pivot the wrist plate relative to the motor plate.

* * * * *